United States Patent
Mikawa

(10) Patent No.: US 8,817,051 B2
(45) Date of Patent: Aug. 26, 2014

(54) DISPLAY CONTROL APPARATUS AND DISPLAY CONTROL METHOD HAVING VARIABLE MAGNIFICATION PROCESSING

(75) Inventor: Chiaki Mikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 12/694,466

(22) Filed: Jan. 27, 2010

(65) Prior Publication Data

US 2010/0199214 A1 Aug. 5, 2010

(30) Foreign Application Priority Data

Feb. 5, 2009 (JP) .................................. 2009/025098

(51) Int. Cl.
*G09G 5/00* (2006.01)
*G09G 5/14* (2006.01)
*G06F 3/0481* (2013.01)

(52) U.S. Cl.
CPC .... *G06F 3/0481* (2013.01); *G06F 2203/04806* (2013.01); *G09G 2340/0464* (2013.01); *G09G 2340/045* (2013.01); *G09G 2354/00* (2013.01); *G09G 5/14* (2013.01)
USPC ........... 345/660; 345/661; 345/662; 345/663; 345/665; 345/667; 345/156; 345/158

(58) Field of Classification Search
CPC .................. G06T 11/60; G06F 3/0481; G06F 2203/04806; G09G 2340/045; G09G 2340/0464
USPC ............................ 345/660, 156; 715/765, 801
See application file for complete search history.

(56) References Cited

U.S. PATENT DOCUMENTS

| | | | | |
|---|---|---|---|---|
| 4,751,507 A | * | 6/1988 | Hama et al. | 715/784 |
| 4,991,022 A | | 2/1991 | Canfield et al. | 358/180 |
| 6,825,860 B1 | * | 11/2004 | Hu et al. | 715/801 |
| 7,420,619 B2 | * | 9/2008 | Cha | 348/561 |
| 2002/0154173 A1 | * | 10/2002 | Etgen et al. | 345/833 |
| 2003/0025715 A1 | * | 2/2003 | Graham et al. | 345/660 |
| 2004/0001636 A1 | * | 1/2004 | Miceli et al. | 382/235 |
| 2004/0088656 A1 | * | 5/2004 | Washio | 715/526 |
| 2005/0060658 A1 | * | 3/2005 | Tsukiori | 715/765 |
| 2005/0128366 A1 | * | 6/2005 | Cha | 348/837 |
| 2005/0195157 A1 | * | 9/2005 | Kramer et al. | 345/156 |
| 2009/0147297 A1 | * | 6/2009 | Stevenson | 358/1.15 |

FOREIGN PATENT DOCUMENTS

JP 2557720 9/1996

* cited by examiner

*Primary Examiner* — Jin-Cheng Wang
(74) *Attorney, Agent, or Firm* — Fitzpatrick, Cella, Harper & Scinto

(57) ABSTRACT

A display control apparatus controls to execute variable magnification processing of a partial image of an image indicated by a display range, and displays the partial image in a display area. The display control apparatus includes a calculation unit which obtains a vertex/vertexes of the display range farthest from a center of the image and sets the vertex or a center point of the vertexes as a reference point, a changing unit which changes a size of the display range while keeping the position of the reference point, and a moving unit which moves the display range in the image. In addition, a display control unit controls to execute the variable magnification processing of the partial image and displays the partial image in the display area. The calculation unit re-calculates the reference point in response to movement of the display range in the image by the moving unit.

8 Claims, 13 Drawing Sheets

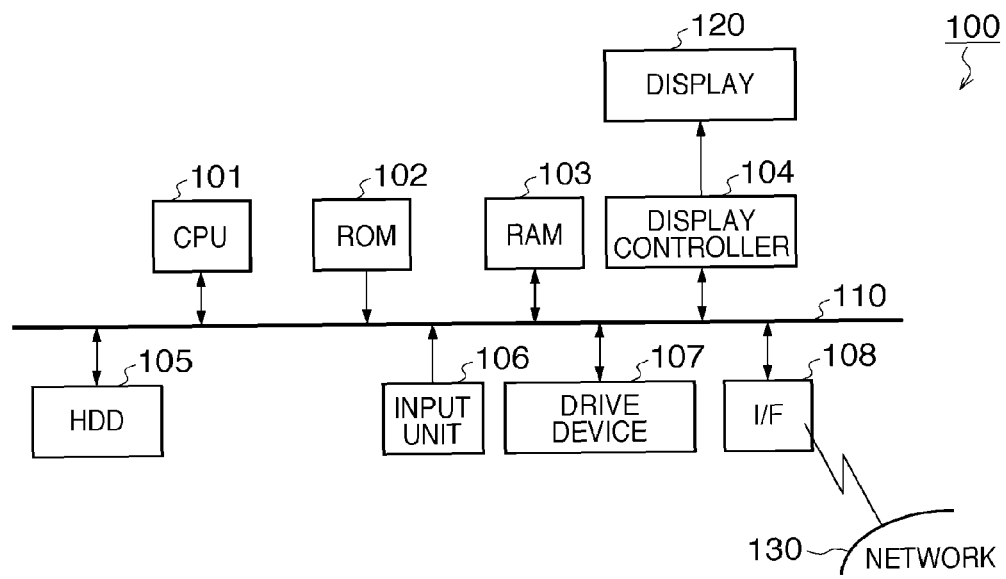
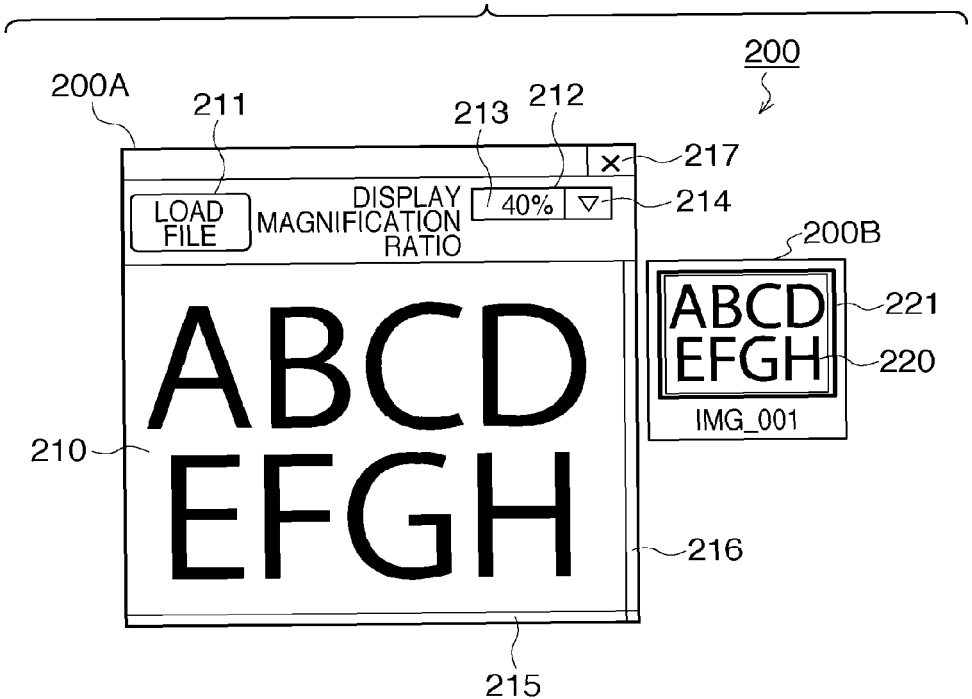

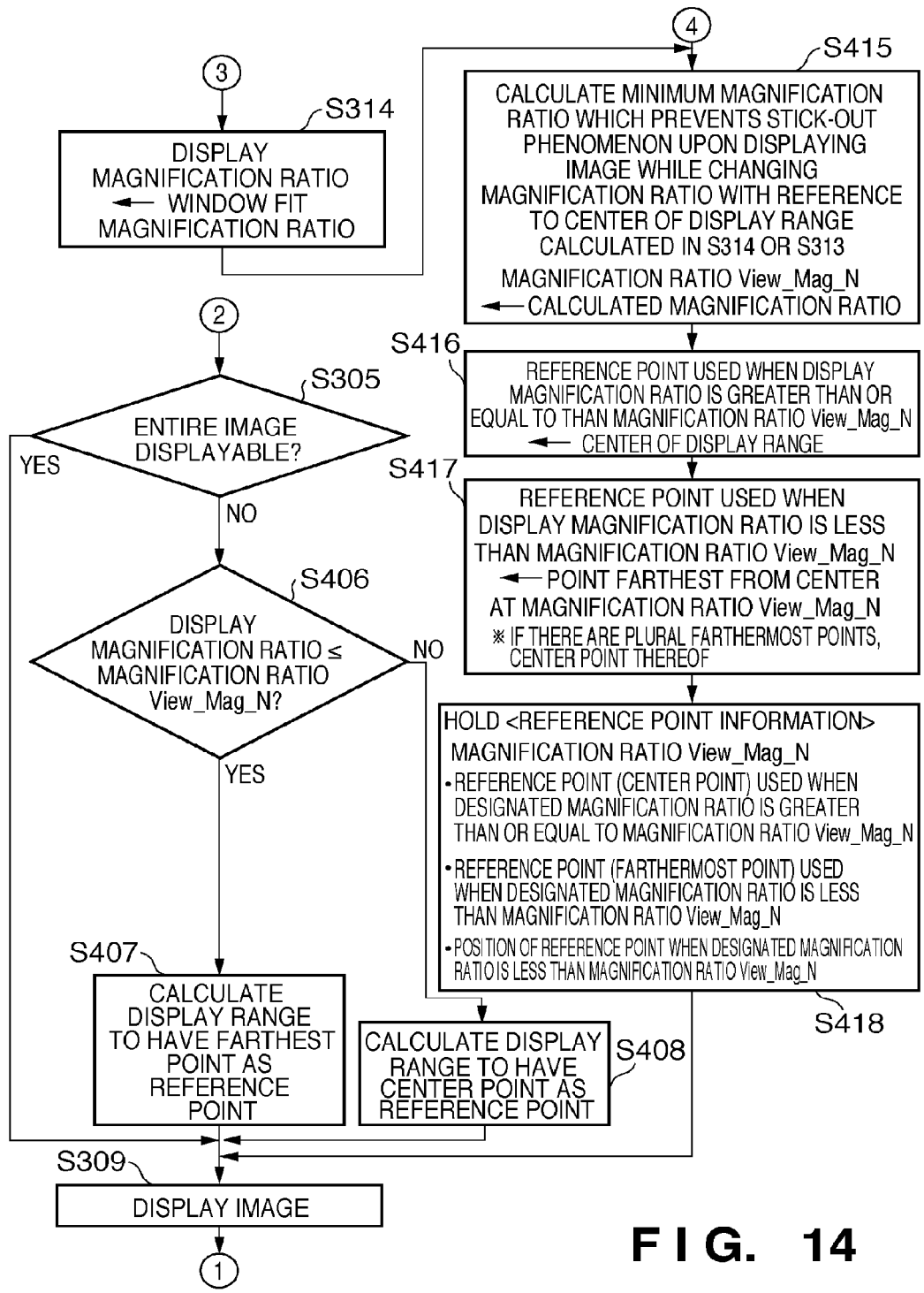
F I G. 14

DISPLAY CONTROL APPARATUS AND DISPLAY CONTROL METHOD HAVING VARIABLE MAGNIFICATION PROCESSING

BACKGROUND OF THE INVENTION

1. Field of the Invention

The present invention relates to a display control apparatus and display control method, which display an image on a display area at a variable magnification ratio.

2. Description of the Related Art

In recent years, the performance of image sensing devices such as CCDs and CMOS sensors has been enhanced, and the number of pixels which can be used by them to sense an image has increased compared to conventional devices. A digital camera, which includes an image sensing device having a large number of pixels, can record image data having an image size, which cannot be entirely displayed on a display having a standard number of display pixels.

It has also become easy for end users to confirm whether or not a sensed image is visually in focus or whether or not an image adjustment result such as contrast adjustment or edge emphasis is desired by zooming out or in the sensed image to be displayed. For example, after the user senses an image using a digital camera provided with an image sensor having a large number of pixels, he or she displays the sensed image on a display of the digital camera. Then, the user zooms into the image displayed on the display by operating the digital camera, and checks if the image is visually in focus.

At this time, as is conventionally done, the user designates a desired part of the image displayed on the display to zoom into the image to have that part as the center. Japanese Patent No. 2557720 describes a technique which zooms into or out of an image with reference to the center of the image after changing the zoom-in ratio of the image.

According to the method of Japanese Patent No. 2557720, when an image is zoomed out with the center of a display range as a reference point, the position of the reference point is changed so as not to display an area outside the image, that is, outside a valid video area. For this reason, when the zoom-in and zoom-out processes of an image to be displayed within the display range are repeated, the display range is gradually moved to the center of the image, thus posing a problem.

This problem will be practically explained using FIGS. 17A to 17D. In FIGS. 17A to 17D, a part of an image 91 (to be referred to as a partial image hereinafter) is displayed on a display range 90. A case will be examined first wherein a partial image to be displayed in the display range 90 is to be zoomed out from a state exemplified in FIG. 17A. In this case, by increasing the display range 90 with respect to the image 91, the partial image displayed in the display range 90 is zoomed out.

The zoom-out processing of the partial image, that is, the increase processing of the display range 90 is executed with reference to a position 92 of the center of the display range 90 according to the related art. Then, as exemplified in FIG. 17B, a part of the display range 90 sticks out beyond the region of the image 91. Hence, by the method disclosed in Japanese Patent No. 2557720, the position of the display range 90 with respect to the image 91 is adjusted by a stick-out amount of the display range 90 from the image 91, so that the display range 90 falls within the region of the image 91, as exemplified in FIG. 17C.

Then, the zoomed-out partial image is zoomed in to a size before the zoom-out processing, that is, the display range 90 is decreased. When this processing is executed with reference to the position 92 of the center of the display range 90, the position of the display range 90 shifts with reference to the partial image before zoom-out processing (FIG. 17A) in the center direction of the image 91 by the position adjustment amount at the time of the zoom-out processing of the partial image. FIG. 17D shows this state.

In this way, when the position of the display range 90 with respect to the image 91 moves every time the zoom-in and zoom-out processes of the partial image are repeated, the user may feel that the displayed image is unnatural.

SUMMARY OF THE INVENTION

The present invention has been made in consideration of the above situation, and provided is a display control apparatus and display control method, which can appropriately execute display control upon repetition of the zoom-in and zoom-out processes of a partial image to be displayed in a display range.

According to the present invention, provided is a display control apparatus, which controls to execute variable magnification processing of a partial image of an image indicated by a display range set for that image in correspondence with a size of a display area, and to display the partial image in the display area, the apparatus comprising: a calculation unit which obtains a vertex/vertexes of the display range farthest from a center of the image, and sets the vertex or a center point of the vertexes as a reference point; a changing unit which changes, in response to an operation for performing the variable magnification processing, a size of the display range so that the reference point set by the calculation unit is located at the same position in the image in display ranges before and after the size is changed; a moving unit which moves the display range in the image in response to an operation for moving the position of the display range; and a display control unit which controls to execute the variable magnification processing of the partial image indicated by the display range changed by the changing unit in correspondence with the size of the display area, and to display the partial image in the display area, wherein the calculation unit re-calculates the reference point in response to movement of the display range in the image by the moving unit.

According to the present invention, further provided is a display control apparatus, which controls to execute variable magnification processing of a partial image of an image indicated by a display range set for that image in correspondence with a size of a display area, and to display the partial image in the display area, the apparatus comprising: a calculation unit which sets a center point of the display range as a first reference point, obtains a vertex/vertexes of the display range farthest from a center of the image, and sets the vertex or a center point of the vertexes as a second reference point; a minimum magnification ratio calculation unit which calculates, when the display range in the image is to be increased, a minimum magnification ratio used when the partial image indicated by the display range corresponding to a size of a maximum display range which prevents the increased display range from sticking out from the image undergoes a variable magnification operation to a size of the display area; a moving unit which moves the display range in the image in response to an operation for moving the position of the display range; a changing unit which compares, when a size of the display range is changed in response to an operation for performing the variable magnification processing, a designated magnification designated by the operation and the minimum magnification ratio calculated by the minimum magnification ratio calculation unit, changes, when the designated magnification is not less than the minimum magnification ratio as a result of the comparison, the size of the display range so that the first reference point is located at the same position in the image in display ranges before and after the size is changed, changes, when the designated magnification is less than the minimum magnification ratio, the size of the display range up to the minimum magnification ratio so that the first reference point is located at the same position in the image in the display ranges before and after the size is changed, and further changes the size of the display range up to the designated magnification ratio so that the second reference point is located at the same position in the image in the display ranges before and after the size is changed; and a display control unit which controls to execute the variable magnification processing of the partial image indicated by the display range changed by the changing unit in correspondence with the size of the display area, and to display the partial image in the display area, wherein the calculation unit re-calculates the first reference point in response to movement of the display range in the image by the moving unit.

Furthermore, according to the present invention, further provided is a display control method, which controls to execute variable magnification processing of a partial image of an image indicated by a display range set for that image in correspondence with a size of a display area, and to display the partial image in the display area, the method comprising: a calculation step of obtaining a vertex/vertexes of the display range farthest from a center of the image, and setting the vertex or a center point of the vertexes as a reference point; a changing step of changing, in response to an operation for performing the variable magnification processing, a size of the display range so that the reference point set in the calculation step is located at the same position in the image in display ranges before and after the size is changed; a moving step of moving the display range in the image in response to an operation for moving the position of the display range; and a display control step of controlling to execute the variable magnification processing of the partial image indicated by the display range changed in the changing step in correspondence with the size of the display area, and to display the partial image in the display area, wherein in the calculation step, the reference point is re-calculated in response to movement of the display range in the image in the moving step.

Further, according to the present invention, further provided is a display control method, which controls to execute variable magnification processing of a partial image of an image indicated by a display range set for that image in correspondence with a size of a display area, and to display the partial image in the display area, the method comprising: a calculation step of setting a center point of the display range as a first reference point, obtaining a vertex/vertexes of the display range farthest from a center of the image, and setting the vertex or a center point of the vertexes as a second reference point; a minimum magnification ratio calculation step of calculating, when the display range in the image is to be increased, a minimum magnification ratio used when the partial image indicated by the display range corresponding to a size of a maximum display range which prevents the increased display range from sticking out from the image undergoes a variable magnification operation to a size of the display area; a moving step of moving the display range in the image in response to an operation for moving the position of the display range; a changing step of comparing, when a size of the display range is changed in response to an operation for performing the variable magnification processing, a designated magnification designated by the operation and the minimum magnification ratio calculated in the minimum magnification ratio calculation step, changing, when the designated magnification is not less than the minimum magnification ratio as a result of the comparison, the size of the display range so that the first reference point is located at the same position in the image in display ranges before and after the size is changed, changing, when the designated magnification is less than the minimum magnification ratio, the size of the display range up to the minimum magnification ratio so that the first reference point is located at the same position in the image in the display ranges before and after the size is changed, and further changing the size of the display range up to the designated magnification ratio so that the second reference point is located at the same position in the image in the display ranges before and after the size is changed; and a display control step of controlling to execute the variable magnification processing of the partial image indicated by the display range changed in the changing step in correspondence with the size of the display area, and to display the partial image in the display area, wherein in the calculation step, the first reference point is re-calculated in response to movement of the display range in the image in the moving step.

Further features of the present invention will become apparent from the following description of exemplary embodiments (with reference to the attached drawings).

BRIEF DESCRIPTION OF THE DRAWINGS

FIG. 2 is a block diagram showing an example of the arrangement of a display control apparatus according to a first embodiment of the present invention;

FIG. 3 is a view showing an example of a user interface according to the first embodiment of the present invention;

FIG. 14 is a flowchart showing an example of display control processing according to a second embodiment of the present invention;

DESCRIPTION OF THE EMBODIMENTS

Preferred embodiments of the present invention will be described in detail in accordance with the accompanying drawings.

<First Embodiment°

The first embodiment of the present invention will be described hereinafter. In the present invention, when a part of an image is displayed on a display area having a fixed display size, a display range which indicates a region of the image to be displayed on the display area is increased or decreased with reference to a point farthest from the center of the image in the display range.

Figure 1A:
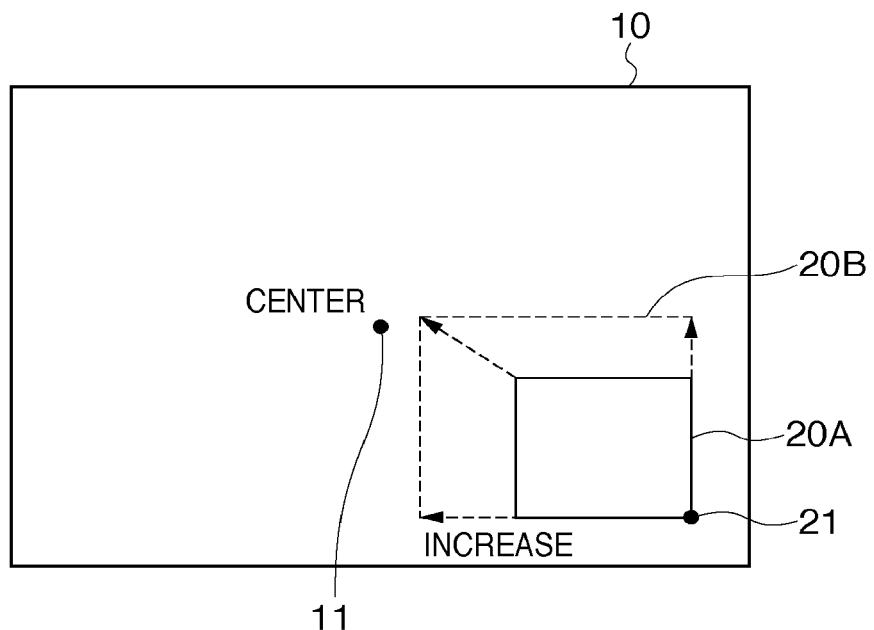
FIGS. 1A and 1B are views for explaining an overview of the present invention.
Figure 1B:
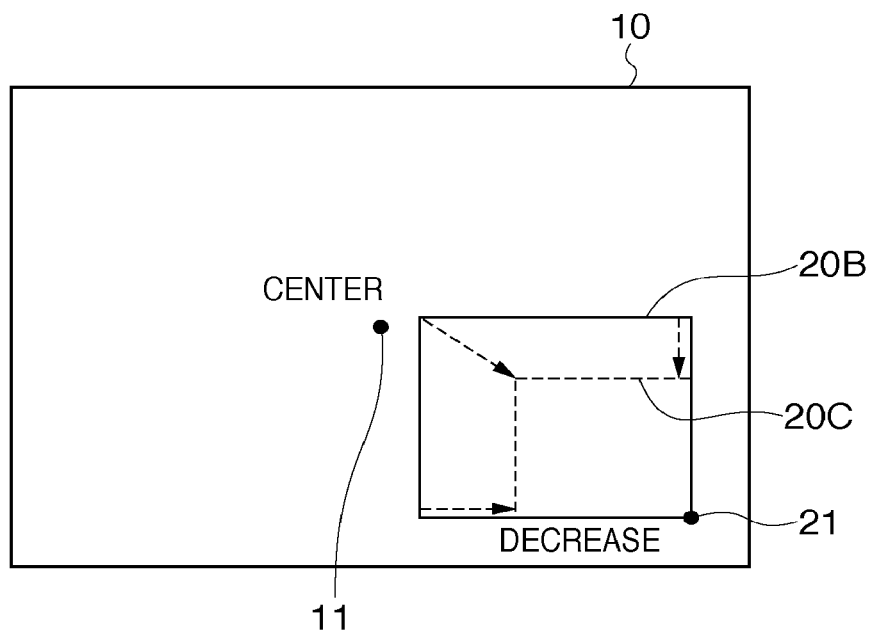

An overview of the present invention will be described below with reference to FIGS. 1A and 1B. Referring to FIGS. 1A and 1B, assume that a part included in a display range 20A (or a display range 20B or 20C) of an image 10 is displayed on a display area having a fixed display size while its size is increased or decreased to fit the display size. Therefore, when the display range 20A is increased, a zoom-in ratio of a partial image to be displayed on the display area becomes small. On the other hand, when the display range 20A is decreased, the zoom-in ratio of the partial image to be displayed on the display area becomes large.

FIG. 1A shows an example when the display range 20A is increased with respect to the image 10 to zoom out a partial image to be displayed on the display area. In this case, the display range 20A is increased with reference to a farthermost point 21 as a point farthest from a center 11 of the image 10. That is, the size of the display range 20A is changed so that the position of the farthermost point 21 with respect to the image 10 remains unchanged.

In the example of FIG. 1A, the farthermost point 21 is set at the lower right corner point of the display range 20A, the center 11 of the image 10 is located on the left side of the farthermost point 21, and the display range 20A is increased in the left and upper directions of the image 10. In other words, by executing the increase processing with reference to the farthermost point 21 of the display range 20A with respect to the center 11 of the image 10, the display range 20A is increased toward the inner side of the image 10. Therefore, the possibility that a display range 20B after the increase processing sticks out from the image 10 can be suppressed, and the necessity of moving the position of the display range 20B with respect to the image 10 is eliminated.

FIG. 1B shows an example when the display range 20B increased in the example of FIG. 1A is decreased with respect to the image 10 to obtain the size of the original display range 20A. In this case as well, the display range 20B is decreased with reference to the farthermost point 21 of the display range 20B with respect to the center 11 of the image 10.

Assume that in the present invention, upon changing the zoom-in ratio of a partial image to be displayed on the display area, the position of a display range including that partial image remains unmoved with respect to the image. As described above, at the time of the zoom-out processing of a partial image to be displayed on the display area, that is, at the time of the increase processing of the display range 20A, the necessity of moving the position of the increased display range 20B with respect to the image 10 is small. For this reason, a change in position of a display range 20C in the image 10 obtained by decreasing the display range 20B with respect to the display range 20A before the increase processing of the display range 20B is suppressed.

Arrangement of Display Control Apparatus

FIG. 2 shows an example of the configuration of a display control apparatus 100 according to the first embodiment of the present invention. As exemplified in FIG. 2, the display control apparatus 100 can be configured using a general computer.

Referring to FIG. 2, a CPU 101, ROM 102, RAM 103, display controller 104, hard disk (HDD) 105, input unit 106, drive device 107, and communication I/F 108 are connected to an internal bus 110. The respective units connected to the internal bus 110 can exchange data via the internal bus 110.

The hard disk 105 stores image data, other data, and various programs required for the operations of the CPU 101. The ROM 102 pre-stores programs and data used when this display control apparatus 100 starts up. The CPU 101 maps programs read out from, for example, the hard disk 105 onto the RAM 103 and executes the programs to control the respective units of this display control apparatus 100. The programs required for the operations of the CPU 101 are not limited to those stored in the hard disk 105, but they may be pre-stored in, for example, the ROM 102.

The input unit 106 receives a user operation, generates a control signal according to the operation, and supplies the control signal to the CPU 101. For example, to the input unit 106, a character information input device such as a keyboard, a pointing device such as a mouse, and the like are connected as input devices that receive user operations. The CPU 101 controls the respective units of this display control apparatus 100 according to the programs based on the control signal which is generated by and supplied from the input unit 106 according to a user operation with respect to the input device. Then, the CPU 101 can control the display control apparatus 100 to operate according to the user operation.

The display controller 104 outputs, to a display 120, a display signal which makes the display 120 display an image at a designated display resolution. The display resolution is designated by, for example, the CPU 101. For example, a display control signal which is generated by the CPU 101 according to the program is supplied to the display controller 104. The display controller 104 generates a display signal based on this display control signal, and outputs the display signal to the display 120. For example, the display controller 104 controls the display 120 to display a GUI (Graphical User Interface) window which forms a user interface based on the display control signal generated by the CPU 101.

The drive device 107 can mount an external storage medium 121 such as a CD or DVD, and reads out or writes data from or in the mounted external storage medium 121 under the control of the CPU 101. Note that the external storage medium 121 that can be mounted in the drive device 107 is not limited to a disk recording medium such as a CD or DVD. For example, a nonvolatile semiconductor memory may be mounted in the drive device 107. The communication interface (I/F) 108 makes communications with a network 130 such as a LAN or the Internet under the control of the CPU 101.

User Interface

An example of a user interface (UI) according to the first embodiment will be described below with reference to FIG. 3. A UI window 200 exemplified in FIG. 3 is displayed on the display 120 when the CPU 101 controls the display controller 104 according to the program stored in, for example, the hard disk 105. The CPU 101 executes various kinds of control according to user operations associated with the display contents on the UI window 200 with respect to the input device connected to the input unit 106.

In the example of FIG. 3, the UI window 200 includes a preview window 200A and navigator window 200B. The preview window 200A includes an image display area 210, file designation field 211, and display magnification ratio designation field 212. The file designation field 211 is used to designate image data stored in the hard disk 105 or the external storage medium 121 mounted in the drive device 107. The display magnification ratio designation field 212 includes a display magnification ratio display field 213 and button 214, and is used to designate a display magnification ratio when image data designated using the file designation field 211 is displayed on the image display area 210.

A button 217 arranged at the upper right corner of the preview window 200A is an end button used to close this UI window 200 and to end a series of processes based on the UI window 200.

The preview window 200A further includes a horizontal scroll bar 215 and vertical scroll bar 216. The horizontal scroll bar 215 and vertical scroll bar 216 are used to move the display range of an image partially displayed on the image display area 210 with respect to its entire image in the horizontal and vertical directions respectively according to user operations.

On the other hand, the navigator window 200B includes a navigator image display area 220 which displays an entire image based on the designated image data. The navigator image display area 220 further displays a frame 221 which indicates the region displayed on the image display area 210 of the preview window 200A. That is, an image of a part surrounded by the frame 221 of the image displayed on the navigator image display area 220 is zoomed in according to the display magnification ratio displayed in the display magnification ratio display field 213, and is displayed on the image display area 210 of the preview window 200A. The position of the frame 221 with respect to the entire image is moved according to a user operation of the horizontal scroll bar 215 and vertical scroll bar 216 arranged on the preview window 200A. The image of the part surrounded by the frame 221 will be also referred to as a partial image hereinafter.

When the user designates image data in the file designation field 211 on such UI window 200, the CPU 101 reads out the designated image data from the hard disk 105 or external storage medium 121. The CPU 101 displays an entire image based on the readout image data on the navigator image display area 220 of the navigator window 200B. At the same time, the CPU 101 zooms in a partial image displayed within the frame 221 of the navigator image display area 220 of the image based on the image data to a display size of the image display area 210 of the preview window 200A, and displays that image on the image display area 210.

The user can designate a display magnification ratio of the partial image to be displayed on the image display area 210 from the display magnification ratio designation field 212. For example, when the user operates the button 214 arranged on the display magnification ratio designation field 212, a pull-down menu which includes a list of a plurality of display magnification ratios (not shown) is displayed on the display magnification ratio display field 213. The pull-down menu displays eight different display magnification ratios: for example, 12.5%, 25%, 40%, 50%, 75%, 100%, 200%, and 400%. The present invention is not limited to such specific display magnification ratios. For example, the user can directly input a display magnification ratio to the display magnification ratio display field 213.

When the user selects a desired display magnification ratio from the pull-down menu, the displayed pull-down menu is closed, and the selected display magnification ratio is displayed on the display magnification ratio display field 213. Then, the frame 221 in the navigator image display area 220 of the navigator window 200B is changed to a size according to the selected display magnification ratio, and the partial image in the frame 221 is zoomed in according to the display magnification ratio and is displayed on the image display area 210.

Note that the display magnification ratio is a value which expresses the ratio of the image size of a part surrounded by the frame 221 in the navigator image display area 220 of the navigator window 200B to the display size of the image display area 210 of the preview window 200A in percent.

For example, when the display size of the image display area 210 is defined by 400 pixels×300 pixels, and the image size surrounded by the frame 221 is defined by 100 pixels×75 pixels, the display magnification ratio is 400%. That is, the image of the part surrounded by the frame 221 is zoomed in to 4 times (400%) in the vertical and horizontal directions, and is displayed on the image display area 210. Similarly, when the display size of the image display area 210 is defined by 400 pixels×300 pixels, and the image size surrounded by the frame 221 is defined by 400 pixels×300 pixels, the display magnification ratio is 100%. This ratio is also called a pixel equal magnification. Furthermore, when the display size of the image display area 210 is defined by 400 pixels×300 pixels, and the image size surrounded by the frame 221 is defined by 1600 pixels×1200 pixels, the display magnification ratio is 25%.

Display Control Processing

Figure 4A:
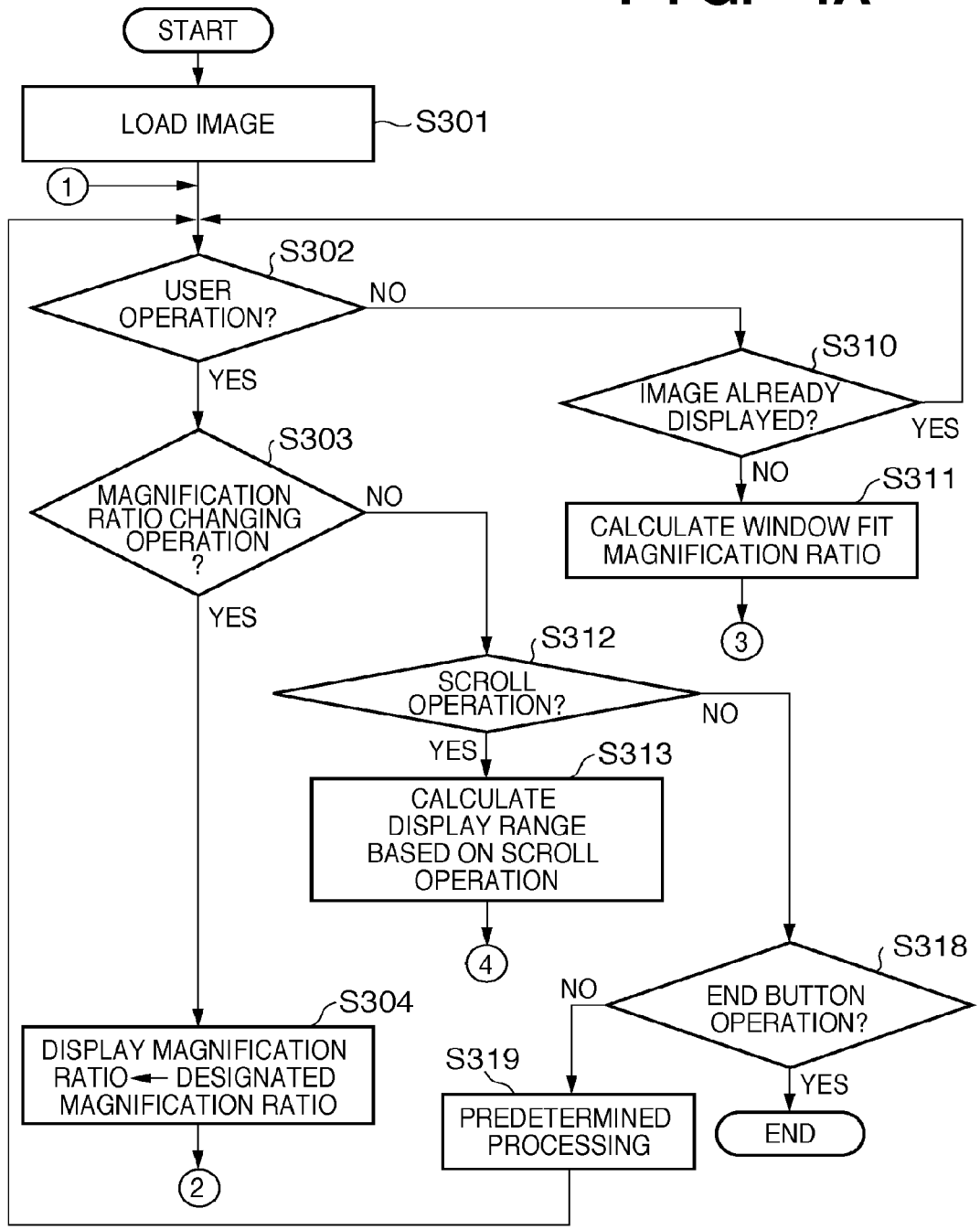
FIGS. 4A and 4B are flowcharts showing an example of display control processing according to the first embodiment of the present invention.
Figure 4B:
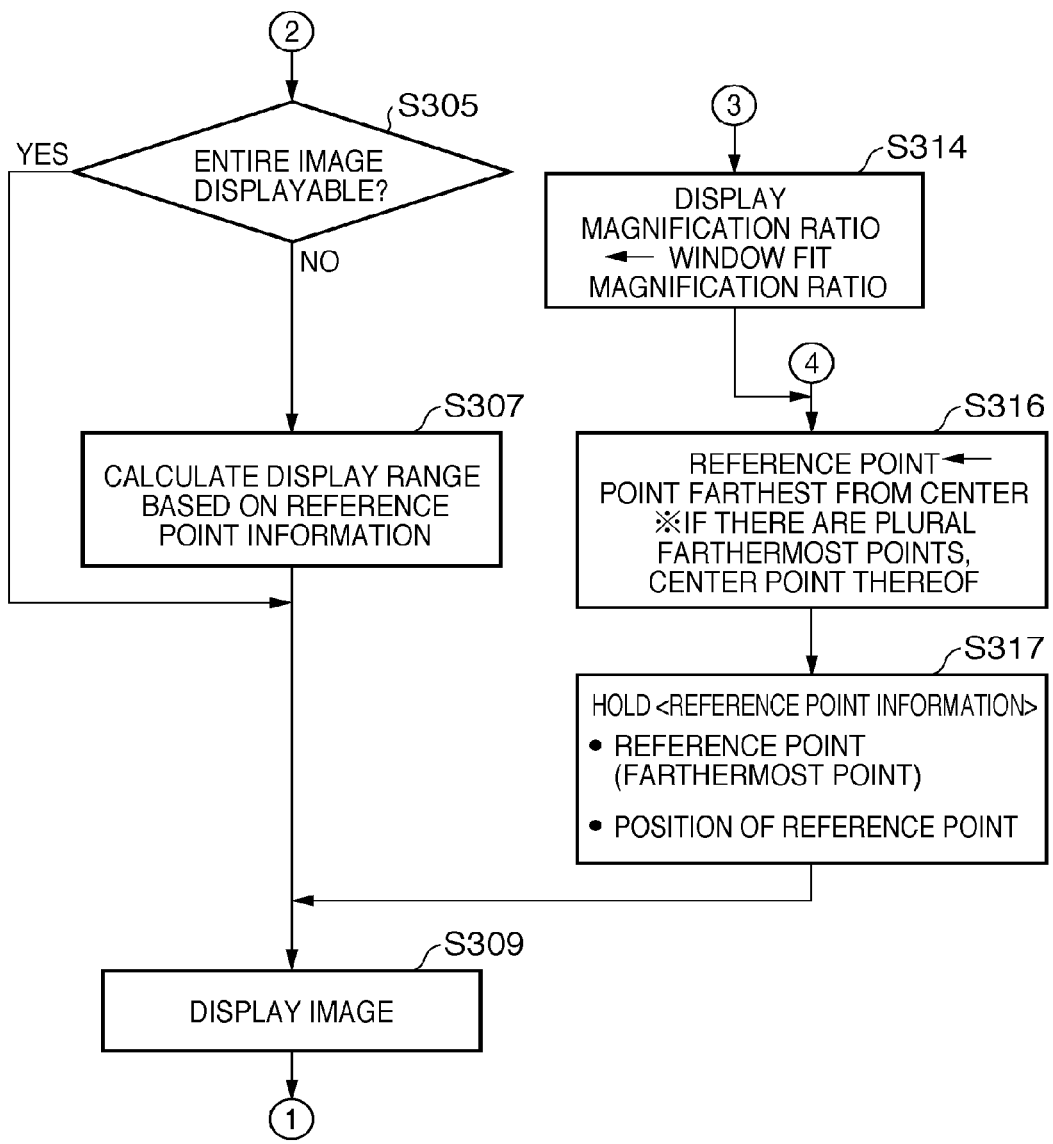

An example of display control processing according to the first embodiment of the present invention will be described below with reference to the flowchart shown in FIGS. 4A and 4B. Note that respective processes in the flowchart shown in FIGS. 4A and 4B are implemented when the CPU 101 executes a program mapped on the RAM 103.

In step S301, the CPU 101 loads image data, which is selected by the user as an image processing target, from the hard disk 105 or external storage medium 121 onto the RAM 103. Then, the CPU 101 displays an image based on the loaded image data onto the image display area 210 of the preview window 200A. For example, the user selects desired image data using a standard file open dialog which is launched by a user operation with respect to the file designation field 211.

In step S302, the CPU 101 checks the presence/absence of a user operation. The user operation in this case includes a selection operation of a display magnification ratio with respect to the display magnification ratio designation field 212, or a moving operation of the display range with respect to the horizontal scroll bar 215 and vertical scroll bar 216. If the CPU 101 determines the presence of a user operation in step S302, the process advances to step S303.

On the other hand, if the CPU 101 determines the absence of a user operation in step S302, the process advances to step S310. The CPU 101 checks in step S310 if an image has already been displayed on the image display area 210. In this case, immediately after the image data is loaded, the process inevitably advances to step S302. If the absence of a user operation is determined in step S302, the processes in step S310 and subsequent steps are executed to display an image based on the loaded image data. If the CPU 101 determines that the image has already been displayed, the process returns to step S302 to wait for a user operation.

On the other hand, if the CPU 101 determines in step S310 that the image has not been displayed yet, the process advances to step S311. In step S311, the CPU 101 calculates a magnification ratio at which at least one size of the two vertical sides and two horizontal sides of the image matches that of the image display area 210, and the image based on the image data can be entirely displayed within the image display area 210. A magnification ratio at which at least one set of the two, vertical sides and the two, horizontal sides of the image contacts and the image can be entirely displayed within the image display area 210 will be referred to as a "window fit magnification ratio" hereinafter. Also, an image to be entirely displayed based on image data will be referred to as an "entire image" hereinafter.

An example of a calculation method of a window fit magnification ratio will be described below under the assumption that variables hold the following values.

View_Mag_Fit: a window fit magnification ratio (%)

View_Mag_HorFit: a magnification ratio (%) when the two, vertical sides of an entire image are in contact with the vertical sides of the image display area 210

View_Mag_VerFit: a magnification ratio (%) when the two, horizontal sides of an entire image are in contact with the horizontal sides of the image display area 210

Image_Width: the width (the number of pixels) of the entire image

Image_Height: the height (the number of pixels) of the entire image

ViewArea_W: the width (the number of pixels) of the image display area 210

ViewArea_H: the height (the number of pixels) of the image display area 210

A magnification ratio View_Mag_HorFit when the two, vertical sides of the entire image are in contact with the vertical sides of the image display area 210 is given by:

$$\text{View\_Mag\_HorFit} = (\text{ViewArea\_W}/\text{Image\_Width}) \times 100 \quad (1)$$

A magnification ratio View_Mag_VerFit when the two, horizontal sides of the entire image are in contact with the horizontal sides of the image display area 210 is given by:

$$\text{View\_Mag\_VerFit} = (\text{ViewArea\_H}/\text{Image\_Height}) \times 100 \quad (2)$$

The magnification ratios View_Mag_HorFit and View_Mag_VerFit are compared with each other, as described by:

$$\text{View\_Mag\_HorFit} < \text{View\_Mag\_VerFit} \quad (3)$$

If inequality (3) is true, that is, if the magnification ratio View_Mag_HorFit is less than the magnification ratio View_Mag_VerFit, the magnification ratio View_Mag_HorFit is set as the window fit magnification View_Mag_Fit, as given by:

$$\text{View\_Mag\_Fit} = \text{View\_Mag\_HorFit} \quad (4)$$

On the other hand, if inequality (3) is false, that is, if the magnification ratio View_Mag_HorFit is greater than or equal to the magnification ratio View_Mag_VerFit, the magnification ratio View_Mag_VerFit is set as the window fit magnification View_Mag_Fit, as given by:

$$\text{View\_Mag\_Fit} = \text{View\_Mag\_VerFit} \quad (5)$$

After the window fit magnification ratio is calculated in step S311, the process advances to step 5314. In step S314, the CPU 101 sets the window fit magnification ratio View_Mag_Fit calculated in step 5311 as a display magnification ratio View_Mag. Then, the process advances to step S316.

In step S316, the CPU 101 calculates a farthermost point as a point farthest from the center of the entire image of the display range displayed on the image display area 210 in the entire image, and sets this farthermost point as a reference point in zoom-in/out processing.

An example of a method of calculating the reference point will be described below. The CPU 101 as a calculation unit calculates this reference point according to a program. The CPU 101 calculates coordinates centerP(cX, cY) of the center of the entire image, for example, according to:

$$cX = \text{Image\_Width}/2 \quad (6)$$

$$cY = \text{Image\_Height}/2 \quad (7)$$

Next, the CPU 101 calculates distances p1_dis, p2_dis, p3_dis, and p4_dis from the center of the entire image to the coordinates of the four corners of the display range. Under the assumption that variables hold the following values:

i_p1(iX0, iY0), i_p2(iX0, iY1), i_p3(iX1, iY0), i_p4(iX1, iY1): coordinates (upper left (x, y), lower left (x, y), upper right (x, y), lower right (x, y)) of the display range, the CPU 101 calculates the distances p1_dis, p2_dis, p3_dis, and p4_dis according to:

$$i\_p1{:}p1\_dis = (iX0-cX)^2 + (iY0-cY)^2 \quad (8)$$

$$i\_p2{:}p2\_dis = (iX0-cX)^2 + (iY1-cY)^2 \quad (9)$$

$$i\_p3{:}p3\_dis = (iX1-cX)^2 + (iY0-cY)^2 \quad (10)$$

$$i\_p4{:}p4\_dis = (iX1-cX)^2 + (iY1-cY)^2 \quad (11)$$

The CPU 101 sets a point corresponding to the largest value of the distances p1_dis, p2_dis, p3_dis, and p4_dis given by equations (8) to (11), that is, the farthermost point from the center of the entire image as coordinates baseP(bX, bY) of the reference point. When there are a plurality of coordinates of the farthermost points, the CPU 101 sets a point, which is located at the center of these plurality of coordinates and is separated by equal distances from the plurality of coordinates, as the coordinates baseP(bX, bY) of the reference point.

The process advances to step S317, and the CPU 101 holds, as reference point information, the coordinates baseP(bX, bY) of the reference point and information of a position of that reference point in the display range. If there are a plurality of coordinates of the farthermost points, the CPU 101 holds, as reference point information, the value of the center of these points, and information of a position of that point in the display range.

Figure 5:
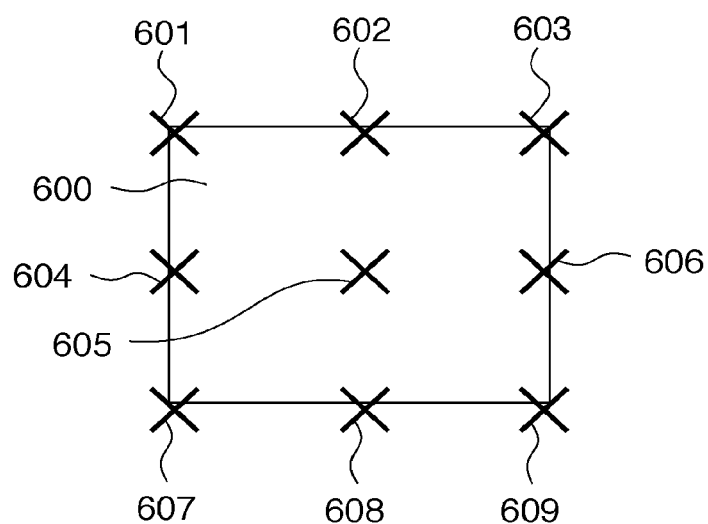
FIG. 5 is a view for explaining the positions of a reference point in a display range.

Assuming that the display range is expressed by a rectangle 600 exemplified in FIG. 5, the position of the reference point is one of positions 601 to 609. Information of the position is held using two values, that is, values posX and posY. The values posX and posY according to the positions of the reference points are defined as follows:

position 601: (0, 0)
position 602: (0.5, 0)
position 603: (1, 0)
position 604: (0, 0.5)
position 605: (0.5, 0.5)
position 606: (1, 0.5)
position 607: (0, 1)
position 608: (0.5, 1)
position 609: (1, 1)

After the coordinates baseP(bX, bY) of the reference point and the information of the position of that reference point in the display range are held in step S317, the process advances to step S309. In step S309, the CPU 101 serving as a changing unit and display control unit sets the display range with respect to the entire image. Then, the CPU 101 zooms in or out the image of the display range in the entire image at the display magnification ratio View_Mag obtained in step S314, and displays it on the image display area 210. If the entire image can be entirely displayed in the image display area 210, the CPU 101 aligns the center of the entire image to that of the image display area 210, and displays the image at the display magnification ratio View_Mag. The process then returns to step S302, and the CPU 101 waits for a user operation.

A method of calculating the display range when the entire image cannot be entirely displayed on the image display area 210 will be described later.

On the other hand, as described above, if the CPU 101 detects the presence of a user operation in step S302, the process advances to step S303. The CPU 101 checks in step S303 if that user operation is a magnification ratio changing operation. The magnification ratio changing operation is, for example, an operation for designating a magnification ratio different from the current magnification ratio in the display magnification ratio display field 213. If the CPU 101 determines that the user operation is not a magnification ratio changing operation, the process advances to step S312.

On the other hand, if the CPU 101 determines in step S303 that the user operation is a magnification ratio changing operation, the process advances to step S304 to set a magnification ratio designated by the user operation as a display magnification ratio View_Mag. The process then advances to step S305, and the CPU 101 checks whether or not the entire image can be entirely displayed on the image display area 210.

In step S305, the CPU 101 compares the window fit magnification ratio View_Mag_Fit and display magnification ratio View_Mag according to:

$$\text{View\_Mag\_Fit} < \text{View\_Mag} \tag{12}$$

If inequality (12) is true, that is, if the window fit magnification ratio View_Mag_Fit is less than the display magnification ratio View_Mag, the CPU 101 determines that the entire image cannot be entirely displayed on the image display area 210. On the other hand, if inequality (12) is false, that is, if the window fit magnification ratio View_Mag_Fit is greater than or equal to the display magnification ratio View_Mag, the CPU 101 determines that the entire image can be entirely displayed on the image display area 210.

If the CPU 101 determines in step S305 that the entire image can be entirely displayed on the image display area 210, it changes the size of the display range according to the display magnification ratio View_Mag. In next step S309, the CPU 101 zooms in or out an image within the changed display range according to the display magnification ratio View_Mag, and displays that image on the image display area 210. Note that FIG. 3 above shows an example when the entire image can be entirely displayed on the image display area 210.

Figure 6:
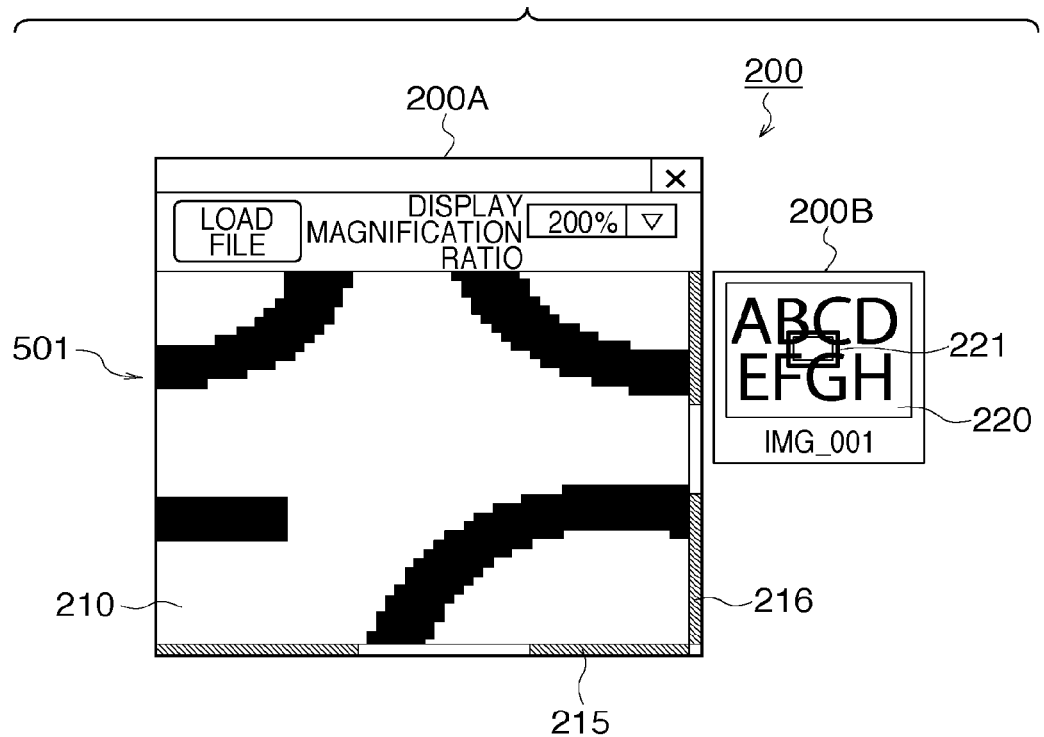
FIG. 6 is a view showing an example when an image cannot be entirely displayed on an image display area.

On the other hand, if the CPU 101 determines in step S305 that the entire image cannot be entirely displayed on the image display area 210, the process advances to step S307. FIG. 6 shows an example when the entire image cannot be entirely displayed on the image display area 210. In step S307, the CPU 101 calculates the display range based on the information of the reference point. In step S309, the CPU 101 then zooms in or out the image within the calculated display range according to the display magnification ratio View_Mag and displays that image on the image display area 210.

As described above, according to the first embodiment, after the image data is loaded onto the RAM 103, the CPU 101 necessarily determines the absence of a user operation in step S302 to execute processes in step S310 and subsequent steps, so as to display an image. Therefore, the information of the reference point is inevitably generated.

An example of the method of calculating the display range in step S307 will be described below. Assume that variables hold the following values:

i_p1(iX0, iY0), i_p2(iX0, iY1), i_p3(iX1, iY0), i_p4(iX1, iY1): coordinates (upper left (x, y), lower left (x, y), upper right (x, y), lower right (x, y)) of the display range Coordinates (i_p1, i_p2, i_p3, i_p4) of the display range when the reference point is represented by coordinates baseP (bX, bY), and information of the position of the reference point is expressed by (posX, posY) are calculated from:

$$iX0 = bX - (\text{ViewArea\_}W \times 100/\text{View\_Mag}) \times posX \tag{13}$$

$$iY0 = bY - (\text{ViewArea\_}H \times 100/\text{View\_Mag}) \times posY \tag{14}$$

$$iX1 = iX0 + \text{ViewArea\_}W \times 100/\text{View\_Mag} \tag{15}$$

$$iY1 = iY0 + \text{ViewArea\_}H \times 100/\text{View\_Mag} \tag{16}$$

If the CPU 101 determines in step S303 above that the user operation is not a magnification ratio changing operation, and the process advances to step S312, it checks if the user operation is a scroll operation. For example, when the user operates the horizontal scroll bar 215 or vertical scroll bar 216, the CPU 101 determines that the user operation is a scroll operation.

If the CPU 101 determines that the user operation is not a scroll operation, the process advances to step S318 to check if the user operation is an operation for the end button 217. If the CPU 101 determines that the user operation is an operation for the end button 217, it ends a series of processes in the flowchart of FIGS. 4A and 4B, and closes the preview window 200A and navigator window 200B. On the other hand, if the CPU 101 determines that the user operation is not an operation for the end button 217, the process advances to step S319 to execute predetermined processing corresponding to that user operation. The process then returns to step S302.

On the other hand, if the CPU 101 determines in step S312 that the user operation is a scroll operation, the process advances to step S313. In step S313, the CPU 101 calculates the display range changed by the scroll operation.

For example, assume that the coordinates of the four corners of the display range before the scroll operation are respectively coordinates ibef_p1, ibef_p2, ibef_p3, and ibef_p4. Also, assume that the moving amount by a scroll operation in the horizontal direction is represented by a moving amount scrollX, and that by a scroll operation in the vertical direction is represented by a moving amount scrollY. Under the assumption that the following variables are held:

ibefp1(ibX0, ibY0), ibef_p2(ibX0, ibY1), ibef_p3(ibX1, ibY0), ibef_p4(ibX1, ibY1): coordinates (upper left (x, y), lower left (x, y), upper right (x, y), lower right (x, y)) of the display range before the scroll operation i_p1(iX0, iY0), i_p2(iX0, iY1), i_p3(iX1, iY0), i_p4(iX1, iY1): coordinates (upper left (x, y), lower left (x, y), upper right (x, y), lower right (x, y)) of the display range after the scroll operation are respectively given by:

$$iX0 = ibX0 + scrollX \times 100/View\_Mag \quad (17)$$

$$iX1 = ibX1 + scrollX \times 100/View\_Mag \quad (18)$$

$$iY0 = ibY0 + scrollY \times 100/View\_Mag \quad (19)$$

$$iY1 = ibY1 + scrollY \times 100/View\_Mag \quad (20)$$

Assume that in the scroll operation in the horizontal direction, a right scroll direction is defined as a plus direction, and a left scroll direction is defined as a minus direction. On the other hand, assume that in the scroll operation in the vertical direction, an upward scroll direction is defined as a minus direction, and a downward scroll direction is defined as a plus direction. The values of the moving amounts scrollX and scrollY represent those in the vertical and horizontal directions by the numbers of pixels in the image display area 210. Assume that the scrollable range is limited to that of the entire image.

After the display range after the scroll operation is calculated in step S313, the process advances to step S316 to calculate the reference point and to hold the reference point information, as described above.

Load Image Data

The processing described above using FIGS. 4A and 4B will be explained below using a practical example. An example of the processing executed when the preview window 200A is launched and image data is loaded first will be described first. The CPU 101 loads image data onto the RAM 103 in step S301, and determines the absence of a user operation in step S302, as described above. The process then advances to step S310 to check if an image has already been displayed on the image display area 210. Since processing for displaying an image on the image display area 210 has not ever been executed in a state immediately after the image data is loaded onto the RAM 103, the CPU 101 determines in step S310 that an image has not been displayed yet.

After that, the process advances to step S311, and the CPU 101 calculates the window fit magnification ratio View_Mag_Fit according to equations (1) to (5). In step S314, the CPU 101 sets the window fit magnification ratio View_Mag_Fit as a display magnification ratio View_Mag. Assume that the width Image_Width and height Image_Height of the entire image are respectively 4000 pixels and 3000 pixels. Also, assume that the width ViewArea_W and height ViewArea_H of the image display area 210 are respectively 1600 pixels and 1200 pixels.

In this case, the CPU 101 calculates, from equations (1) and (2) above, a magnification ratio View_Mag_Horfit when the two vertical sides of the entire image are in contact with the two vertical sides of the image display area 210 and a magnification ratio View_Mag_VerFit when the two horizontal sides of the entire image are in contact with the two horizontal sides of the image display area 210 respectively by:

$$View\_Mag\_HorFit = (ViewArea\_W/Image\_Width) \times 100 = 1600/4000 \times 100 = 40 \quad (21)$$

$$View\_Mag\_VerFit = (ViewArea\_H/Image\_Height) \times 100 = 1200/3000 \times 100 = 40 \quad (22)$$

In this case, since we have:

$$View\_Mag = View\_Fit = View\_Mag\_HorFit = View\_Mag\_VerFit = 40 \quad (23)$$

the window fit magnification ratio View_Mag_Fit=40%, and also the display magnification ratio View_Mag=40%.

The process advances to step S316, and the CPU 101 sets the farthermost point with respect to the center of the entire image in the display range as a reference point for the zoom-in and zoom-out processes. From equations (6) and (7) above, the coordinates centerP(cX, cY) of the center of the entire image=centerP(2000, 1500), as given by:

$$cX = Image\_Width/2 = 4000/2 = 2000 \quad (24)$$

$$cY = Image\_Height/2 = 3000/2 = 1500 \quad (25)$$

In case of a window fit state, the entire image is entirely displayed on the image display area 210. For this reason, the coordinates of the display range are coordinates (0, 0)-(4000, 3000), as described by:

$$iX0 = 0 \quad (26)$$

$$iY0 = 0 \quad (27)$$

$$iX1 = Image\_Width = 4000 \quad (28)$$

$$iY1 = Image\_Height = 3000 \quad (29)$$

The CPU 101 calculates, from equations (8) to (11) above, the distances p1_dis, p2_dis, p3_dis, and p4_dis of the four corners of the display range from the center of the entire image, as described by:

$$i\_p1{:}p1\_dis = (iX0 - cX)^2 + (iY0 - cY)^2 = (0 - 2000)^2 + (0 - 1500)^2 \quad (30)$$

$$i\_p2{:}p2\_dis = (iX0 - cX)^2 + (iY1 - cY)^2 = (0 - 2000)^2 + (3000 - 1500)^2 \quad (31)$$

$$i\_p3{:}p3\_dis = (iX1 - cX)^2 + (iY0 - cY)^2 = (4000 - 2000)^2 + (0 - 1500)^2 \quad (32)$$

$$i\_p4{:}p4\_dis = (iX1 - cX)^2 + (iY1 - cY)^2 = (4000 - 2000)^2 + (3000 - 1500)^2 \quad (33)$$

In this case, since all of the four distances have an identical value, all the four points of the four corners of the display range are used as farthermost point candidates.

As described above, when there are a plurality of farthermost points, the coordinates of the center of these points are set as those of a reference point. In this example, the reference point is calculated to have the same coordinates baseP(2000, 1500) as those of the center.

In the next step S317, the CPU 101 holds the coordinates baseP(bX, bY) of the reference point, and information of the position of that point as reference point information. In this example, the coordinates of the reference point are the coordinates baseP(2000, 1500), the position of the reference point is the position 605 in FIG. 5, and the reference point information is (0.5, 0.5).

The process advances to step S309, and the CPU 101 displays the entire image at the window fit magnification ratio View_Mag_Fit=40%, so that the center of the entire image overlaps that of the image display area 210. In this case, the state of the image display area 210 is as shown in, for example, FIG. 3.

Zoom-In Processing (1)

Processing for increasing a display magnification ratio to 200% after the aforementioned image data loading processing will be described below. If the CPU 101 determines the presence of a user operation in step S302, and determines in step S303 that the user operation is a display magnification ratio changing operation, it sets a magnification ratio designated by the user operation as a display magnification ratio View_Mag in step S304. In this example, the display magnification ratio View_Mag=200%.

The CPU 101 checks in step S305 if the entire image can be entirely displayed on the image display area 210. In this example, since the window fit magnification ratio View_Mag_Fit=40% and the display magnification ratio View_Mag=200%, inequality (12) above is true, and the CPU 101 determines that the entire image cannot be entirely displayed on the image display area 210.

Then, the process advances to step S307, and the CPU 101 calculates the display range based on the reference point information. In the aforementioned image data loading processing, the reference point is set at the coordinates baseP (2000, 1500), and the position of the reference point is (0.5, 0.5). Therefore, the CPU 101 calculates, from equations (13) to (16) above, the coordinates i_p1(iX0, iY0), i_p2(iX0, iY1), i_p3(iX1, iY0), and i_p4(iX1, iY1) of the display range, as described by:

$$iX0=bX-(ViewArea\_W\times100/View\_Mag)\times posX=2000-(1600\times100/200)\times0.5=1600 \qquad (34)$$

$$iY0=bY-(ViewArea\_H\times100/View\_Mag)\times posY=1500-(1200\times100/200)\times0.5=1200 \qquad (35)$$

$$iX1=iX0+ViewArea\_W\times100/View\_Mag=1600+1600\times100/200=2400 \qquad (36)$$

$$iY1=iY0+ViewArea\_H\times100/View\_Mag=1200+1200\times100/200=1800 \qquad (37)$$

In step S309, the CPU 101 zooms in an image in the display range defined by the coordinates i_p1(1600, 1200), i_p2(1600, 1800), i_p3(2400, 1200), and i_p4(2400, 1800) calculated in step S307 in the entire image at the display magnification ratio=200%. Then, the CPU 101 displays the zoomed-in image on the image display area 210. A display example in this case is as indicated by a display 501 in FIG. 6.

Scroll Processing

Next, processing executed when the user operates the horizontal scroll bar 215 or vertical scroll bar 216 to move the display range in the entire image after the aforementioned zoom-in processing (1) will be described below. If the CPU 101 determines the presence of a user operation in step S302, and determines in steps S303 and S312 that the user operation is a scroll operation, it calculates the display range after the scroll operation in step S313.

Assume that the original display range before the scroll operation is the display range defined by the coordinates i_p1(1600, 1200), i_p2(1600, 1800), i_p3(2400, 1200), and i_p4(2400, 1800) after the aforementioned zoom-in processing. Also, assume that the moving amount scrollX=3200 by the operation of the horizontal scroll bar 215, and the moving amount scrollY=2400 by the operation of the vertical scroll bar 216.

In this case, the CPU 101 calculates, from equations (17) to (20) above, the coordinates i_p1(iX0, iY0), i_p2(iX0, iY1), i_p3(iX1, iY0), and i_p4(iX1, iY1) of the display range after the scroll operation, as described by:

$$iX0=ibX0+scrollX\times100/View\_Mag=1600+3200\times100/200=3200 \qquad (38)$$

$$iX1=ibX1+scrollX\times100/View\_Mag=2400+3200\times100/200=4000 \qquad (39)$$

$$iY0=ibY0+scrollY\times100/View\_Mag=1200+2400\times100/200=2400 \qquad (40)$$

$$iY1=ibY1+scrollY\times100/View\_Mag=1800+2400\times100/200=3000 \qquad (41)$$

After the display range after the scroll operation is calculated, the process advances to step S316, and the CPU 101 calculates the farthermost point of the display range with respect to the center of the entire image and sets the calculated farthermost point as a reference point for the zoom-in and zoom-out processes. The farthermost point is calculated as the lower right corner point i_p4 by:

$$i\_p1:p1\_dis=(iX0-cX)^2+(iY0-cY)^2=(3200-2000)^2+(2400-1500)^2=1440000+810000=2250000 \qquad (42)$$

$$i\_p2:p2\_dis=(iX0-cX)^2+(iY1-cY)^2=(3200-2000)^2+(3000-1500)^2=1440000+2250000=3690000 \qquad (43)$$

$$i\_p3:p3\_dis=(iX1-cX)^2+(iY0-cY)^2=(4000-2000)^2+(2400-1500)^2=4000000+810000=4810000 \qquad (44)$$

$$i\_p4:p4\_dis=(iX1-cX)^2+(iY1-cY)^2=(4000-2000)^2+(3000-1500)^2=4000000+2250000=6250000 \qquad (45)$$

In step S317, the CPU 101 holds the coordinates baseP(bX, bY) of the reference point and information of the position of that point as reference point information. In this example, the coordinates of the reference point are coordinates baseP (4000, 3000), the position of the reference point is the position 609 in FIG. 5, and the reference point information is (1, 1).

In step S309, the CPU 101 zooms in an image in the display range defined by the coordinates i_p1(3200, 2400), i_p2 (3200, 3000), i_p3(4000, 2400), and i_p4(4000, 3000) calculated in step S307 in the entire image at a magnification ratio=200%, and displays it on the image display area 210. A display example in this case is as indicated by a display 701 in FIG. 7.

Zoom-Out Processing (1)

Processing for changing the display magnification ratio to 100% after the aforementioned scroll operation will be described below. In the above description, since the image of the display range is zoomed in to 200% and is displayed on the image display area 210, the image of the display range, which is zoomed in to 200%, is zoomed out to a display magnification ratio=100% in this processing. If the CPU 101 determines the presence of a user operation in step S302, and determines in step S303 that the user operation is a display magnification ratio changing operation, it sets a magnification ratio designated by the user operation as a display magnification ratio View_Mag in step S304. In this example, the display magnification ratio View_Mag=100%.

The CPU 101 checks in step S305 if the entire image can be entirely displayed on the image display area 210. In this example, since the window fit magnification ratio View_Mag_Fit=40% and the display magnification ratio View_Mag=100%, inequality (12) above is true, and the CPU 101 determines that the entire image cannot be entirely displayed on the image display area 210.

Then, the process advances to step S307, and the CPU 101 calculates the display range based on the reference point information. In the aforementioned scroll processing, the reference point is set at the coordinates baseP(4000, 3000), and the position of the reference point is (1, 1). Therefore, the CPU 101 calculates, from equations (13) to (16) above, the coordinates i_p1(iX0, iY0), i_p2(iX0, iY1), i_p3(iX1, iY0), and i_p4(iX1, iY1) of the display range, as described by:

$$iX0=bX-(ViewArea\_W\times100/View\_Mag)\times posX=4000-(1600\times100/100)\times1=2400 \qquad (46)$$

$$iY0=bY-(ViewArea\_H\times100/View\_Mag)\times posY=3000-(1200\times100/100)\times1=1800 \qquad (47)$$

$$iX1=iX0+ViewArea\_W\times100/View\_Mag=2400+ \\ 1600\times100/100=4000 \quad (48)$$

$$iY1=iY0+ViewArea\_H\times100/View\_Mag=1800+1200\times \\ 100/100=3000 \quad (49)$$

Figure 8:
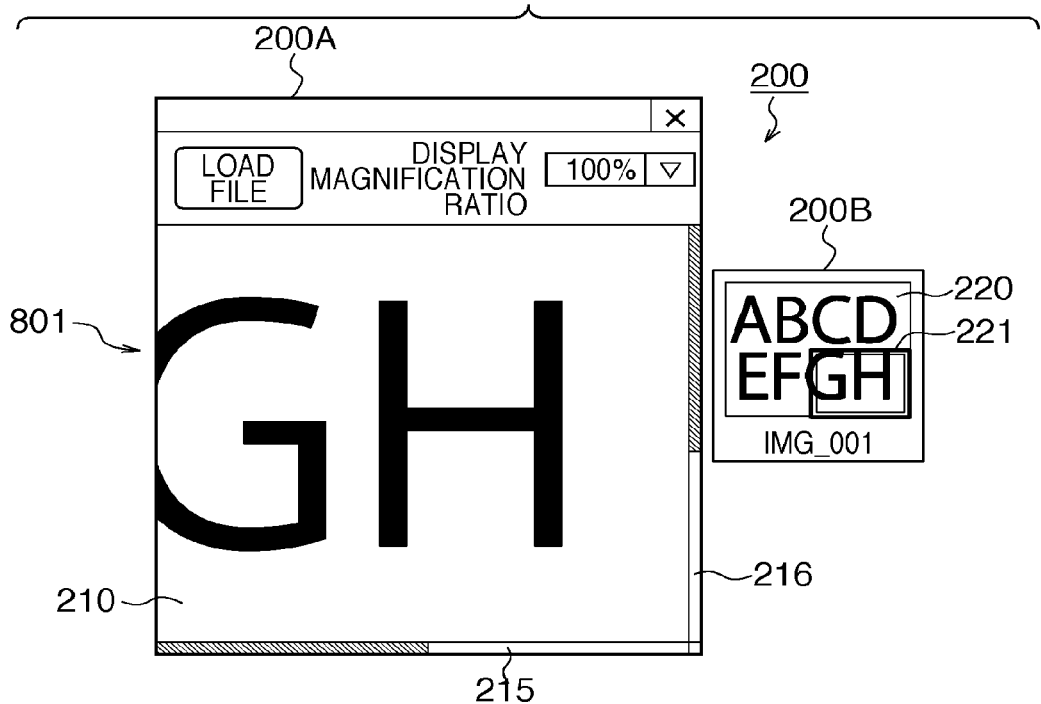
FIG. 8 is a view showing a display example of the UI window.

In step S309, the CPU 101 displays an image in the display range defined by the coordinates i_p1(2400, 1800), i_p2 (2400, 3000), i_p3(4000, 1800), and i_p4(4000, 3000) calculated in step S307 in the entire image at the display magnification ratio=100% on the image display area 210. A display example in this case is as indicated by a display 801 in FIG. 8.

Zoom-In Processing (2)

Next, processing for increasing the display magnification ratio to 200% after the aforementioned zoom-out processing (1) will be described below. If the CPU 101 determines the presence of a user operation in step S302, and determines in step S303 that the user operation is a display magnification ratio changing operation, it sets a magnification ratio designated by the user operation as a display magnification ratio View_Mag in step S304. In this example, the display magnification ratio View_Mag=200%.

The CPU 101 checks in step S305 if the entire image can be entirely displayed on the image display area 210. In this example, since the window fit magnification ratio View_Mag_Fit=40% and the display magnification ratio View_Mag=200%, inequality (12) above is true, and the CPU 101 determines that the entire image cannot be entirely displayed on the image display area 210.

Then, the process advances to step S307, and the CPU 101 calculates the display range based on the reference point information. In the aforementioned zoom-out processing, the reference point information is not changed. Therefore, the reference point remains set at the coordinates baseP(4000, 3000), and the position of the reference point also remains at (1, 1). Therefore, the CPU 101 calculates, from equations (13) to (16) above, the coordinates i_p1(iX0, iY0), i_p2(iX0, iY1), i_p3(iX1, iY0), and i_p4(iX1, iY1) of the display range, as described by:

$$iX0=bX-(ViewArea\_W\times100/View\_Mag)\times \\ posX=4000-(1600\times100/200)\times1=3200 \quad (50)$$

$$iY0=bY-(ViewArea\_H\times100/View\_Mag)\times \\ posY=3000-(1200\times100/200)\times1=2400 \quad (51)$$

$$iX1=iX0+ViewArea\_W\times100/View\_Mag=3200+ \\ 1600\times100/200=4000 \quad (52)$$

$$iY1=iY0+ViewArea\_H\times100/View\_Mag=2400+1200\times \\ 100/200=3000 \quad (53)$$

In step S309, the CPU 101 displays an image in the display range defined by the coordinates i_p1(3200, 2400), i_p2 (3200, 3000), i_p3(4000, 2400), and i_p4(4000, 3000) calculated in step S307 in the entire image at the display magnification ratio=200% on the image display area 210. A display example in this case is as indicated by the display 701 in FIG. 7.

Zoom-Out Processing (2)

Processing for changing the display magnification ratio to 100% after the aforementioned zoom-in processing (2) will be described below. In the above description, since the image of the display range is zoomed in to 200% and is displayed in the image display area 210, the image of the display range, which is zoomed in to 200%, is zoomed out to a display magnification ratio=100% in this processing. If the CPU 101 determines the presence of a user operation in step S302, and determines in step S303 that the user operation is a display magnification ratio changing operation, it sets a magnification ratio designated by the user operation as a display magnification ratio View_Mag in step S304. In this example, the display magnification ratio View_Mag=100%.

The CPU 101 checks in step S305 if the entire image can be entirely displayed on the image display area 210. In this example, since the window fit magnification ratio View_Mag_Fit=40% and the display magnification ratio View_Mag=100%, inequality (12) above is true, and the CPU 101 determines that the entire image cannot be entirely displayed on the image display area 210.

Then, the process advances to step S307, and the CPU 101 calculates the display range based on the reference point information. In the aforementioned zoom-in processing (2), the reference point is set at the coordinates baseP(4000, 3000), and the position of the reference point is (1, 1). Therefore, the CPU 101 calculates, from equations (13) to (16) above, the coordinates i_p1(iX0, iY0), i_p2(iX0, iY1), i_p3 (iX1, iY0), and i_p4(iX1, iY1) of the display range, as described by:

$$iX0=bX-(ViewArea\_W\times100/View\_Mag)\times \\ posX=4000-(1600\times100/100)\times1=2400 \quad (54)$$

$$iY0=bY-(ViewArea\_H\times100/View\_Mag)\times \\ posY=3000-(1200\times100/100)\times1=1800 \quad (55)$$

$$iX1=iX0+ViewArea\_W\times100/View\_Mag=2400+ \\ 1600\times100/100=4000 \quad (56)$$

$$iY1=iY0+ViewArea\_H\times100/View\_Mag=1800+1200\times \\ 100/100=3000 \quad (57)$$

In step S309, the CPU 101 displays an image in the display range defined by the coordinates i_p1(2400, 1800), i_p2 (2400, 3000), i_p3(4000, 1800), and i_p4(4000, 3000) calculated in step S307 in the entire image at the display magnification ratio=100% on the image display area 210. A display example in this case is as indicated by the display 801 in FIG. 8.

About Reason why Farthermost Point is Set as Reference Point for Zoom-In and Zoom-Out Processes Next, the reason why the farthermost point of the display range with respect to the center of the entire image is set as the reference point used upon increasing and decreasing the display range will be described below. A case will be explained first with reference to FIGS. 9A to 9F wherein the aspect ratio of the display range matches that of the entire image. Assume that a display range 910 is initially located near the end of an entire image 900, as exemplified in FIG. 9A. A case will be examined below wherein the display range 910 is increased with respect to the entire image 900 from this state to zoom out an image displayed in the image display area 210.

Figure 9A:
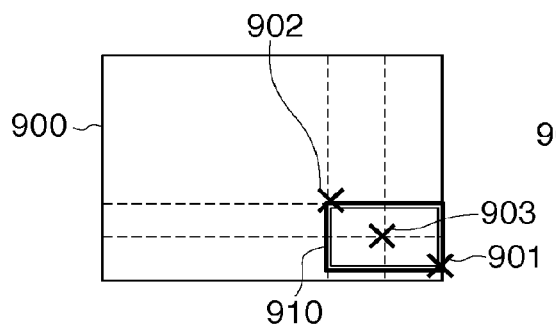
FIGS. 9A to 9F are views for explaining the reason why the farthermost point of a display range with respect to the center of the entire image is set as a reference point upon increasing/decreasing the display range.
Figure 9B:
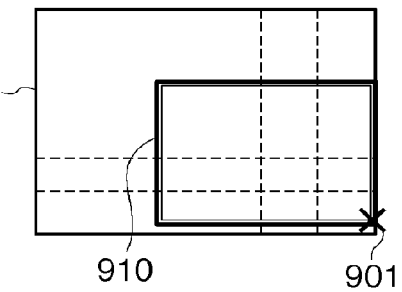

When the display range 910 is increased using a point 901 as the farthermost point from the center of the entire image 900 in the display range 910 as a reference point, the display range 910 is unlikely to stick out from the entire image 900, as exemplified in FIG. 9B.

On the other hand, when the display range 910 is increased without using the farthermost point as a reference point, the display range 910 is more likely to stick out from the entire image 900. For example, when the display range 910 is increased using a point 902 closest to the center of the entire image 900 in the display range 910 as a reference point, the display range 910 is likely to stick out from the entire image 900, as exemplified in FIG. 9C. As another example, when the display range 910 is increased using a center point 903 of the display range 910 as a reference point, the display range 910 is likely to stick out from the entire image 900, as exemplified in FIG. 9D.

A description will be given in more detail below. When the farthermost point as a point farthest from the center of the entire image in the display range is set as a reference point for the zoom-in and zoom-out processes, inequalities (58) and (59) always become true:

$$Image\_Width > bX \quad (58)$$

$$Image\_Height > bY \quad (59)$$

In other words, the coordinates baseP(bX, bY) of the reference point are always located within the entire image.

Since the coordinates (bX, bY) represent a point farthest from the center of the entire image of the coordinates in the display range, points other than the coordinates (bX, bY) in the display range are closer to the center of the entire image than the coordinates (bX, bY). Therefore, all inequalities (60) to (63) are true.

$$Image\_Width > iX0 \quad (60)$$

$$Image\_Width > iX1 \quad (61)$$

$$Image\_Height > iY0 \quad (62)$$

$$Image\_Height > iY1 \quad (63)$$

Then, when the display range is calculated in step S307 in FIG. 4B upon zooming out an image to be displayed on the image display area 210, that is, upon increasing the display range, the display range is updated to have the fixed farthermost point in the display range with respect to the entire image. Therefore, the display range is likely to stick out from the entire image. That is, in this case as well, inequalities (60) to (63) are more likely to be true.

Next, a case will be described below with reference to FIGS. 10A to 10H wherein the aspect ratio of the display range is different from that of the entire image. Assume that a display range 1010 is initially located near the end of an entire image 1000, as exemplified in FIG. 10A. A case will be examined below wherein the display range 1010 is increased with respect to the entire image 1000 from this state so as to zoom out an image displayed on the image display area 210.

Figure 10A:
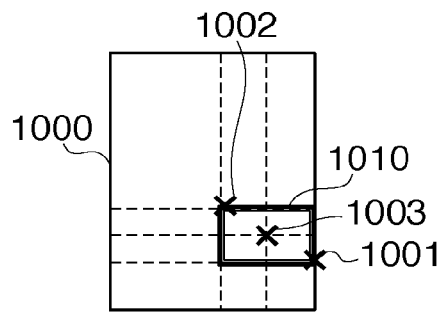
FIGS. 10A to 10H are views for explaining the reason why the farthermost point of the display range with respect to the center of the entire image is set as the reference point upon increasing/decreasing the display range.
Figure 10B:
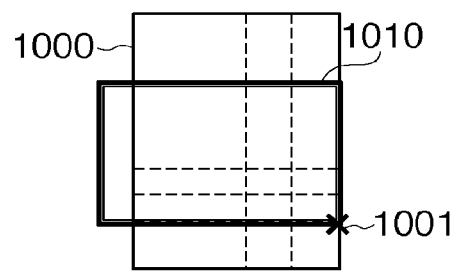

When the display range 1010 is increased using, as a reference point, a point 1001 as a farthermost point with respect to the entire image 1000 in the display range 1010, an area of the display range 1010, which sticks out from the entire image 1000, is small, as exemplified in FIG. 10B. In this case, the effective display area of the image display area 210 broadens.

On the other hand, when the display range 1010 is increased without using the farthermost point as a reference point, the display range 1010 is more likely to stick out from the entire image 1000. In this case, the effective display area of the image display area 210 narrows down.

Figure 10C:
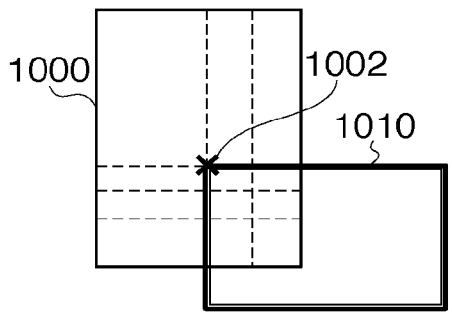

For example, when the display range 1010 is increased using a point 1002 closest to the center of the entire image 1000 in the display range 1010 as a reference point, the area of the display range 1010, which sticks out from the entire image 1000, is likely to broaden, as exemplified in FIG. 10C. In this case, an effective display area of the image display area 210 narrows down.

Figure 10D:
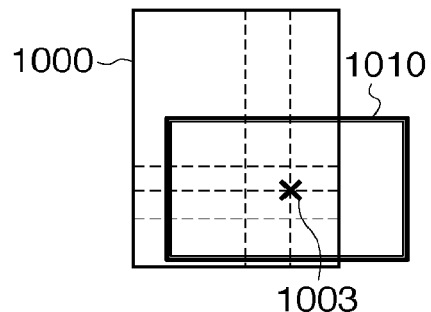
Figure 10E:
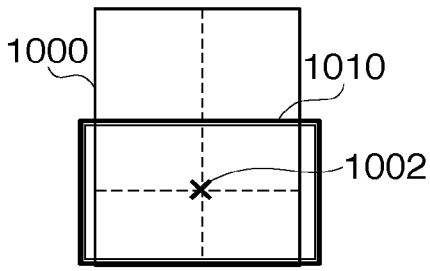
Figure 10F:
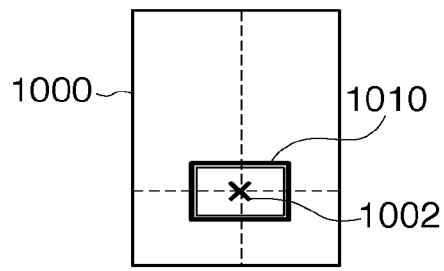

As another example, when the display range 1010 is increased to have a center point 1003 of the display range 1010 as a reference point, the area of the display range 1010, which sticks out from the entire image 1000, is likely to broaden, as exemplified in FIG. 10D. In this case as well, an effective display area of the image display area 210 narrows down.

In this way, when the farthermost point 1001 with respect to the entire image 100 in the display range 1010 is set as a reference point for the zoom-in and zoom-out processes, the effective area as an image can be broadly displayed on the image display area 210. For this reason, a UI more convenient than a case in which a point other than the farthermost point in the display range, for example, the point 1002 closest to the center of the entire image or the center point 1003 of the display range is set as the reference point for the zoom-in and zoom-out processes can be provided to the user.

As described above, according to the first embodiment of the present invention, since reference point information is generated with reference to the coordinates of the display range, which are farthest from the center of the entire image, a state in which the display range sticks out from the entire image can be suppressed. Even when the aspect ratio of the display range is different from that of an image main body, since an effective area as an image can be broadly displayed, a convenient UI can be provided to the user.

Also, according to the first embodiment of the present invention, the display range is unlikely to stick out from the entire image. For this reason, correction processing of the position of the display range when the display range sticks out from the entire image can be minimized. Therefore, a phenomenon that the display range gradually shifts due to the correction processing of the position of the display range upon repeating the increase/decrease processes of the display range can be suppressed.

The phenomenon that the display range gradually shifts due to the correction processing of the position of the display range upon repetition of the increase/decrease processes of the display range will be explained below. As a measure against sticking out of the display range from the entire image, a method of adjusting the coordinates of the display range with respect to the entire image so that the display range falls within the entire image is known. With this method, the position of the display range with respect to the entire image gradually shifts upon repetition of the increase and decrease processes of the display range. The confirmed position gradually shifts by only operations for changing the magnification ratio of an image to be displayed on the image display area 210, resulting in poor convenience.

A more practical description will be given with reference to FIGS. 9A to 9F and FIGS. 10A to 10H.

For example, a case will be examined below wherein the size of the display range 910 is changed from a state in which the display range 910 is located near the end of the entire image 900, as shown in FIG. 9A, and it is then restored to the size in the example of FIG. 9A.

Figure 9C:
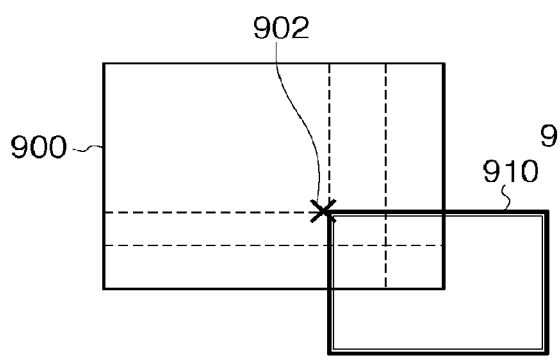
Figure 9D:
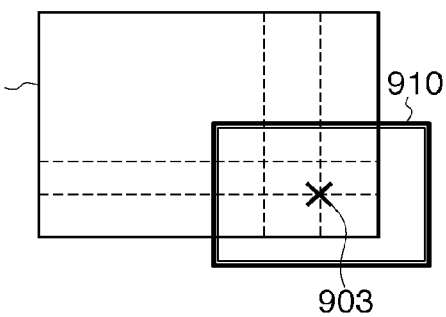
Figure 9E:
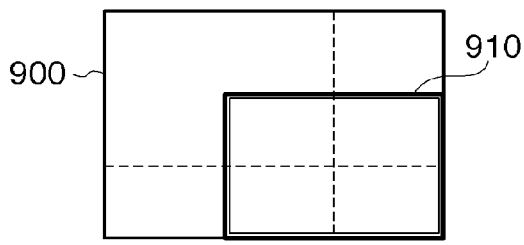
Figure 9F:
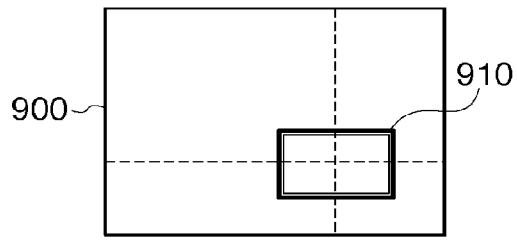

In this case, the following method may be used. That is, when the size of the display range 910 is increased from the state of FIG. 9A, and only when the display range 910 sticks out from the entire image 900, as shown in FIG. 9C or 9D, the coordinates of the display range 910 are adjusted by only a stick-out amount, so that the display range 910 falls within the entire image 900, as exemplified in FIG. 9E. In this case, when the size of the display range 910 is restored to that in FIG. 9A again after adjustment of the coordinates of the display range 910, the position of the display range 910 shifts from that in FIG. 9A by the coordinate adjustment amount of the display range 910, as shown in, for example, FIG. 9F.

The same applies to the case shown in FIGS. 10A to 10H in which the aspect ratio of the display range 1010 is different from that of the entire image 1000. For example, a case will be examined below wherein the size of the display range 1010 is changed from a state in which the display range 1010 is located near the end of the entire image 1000, as shown in FIG. 10A, and it is then restored to the size in FIG. 10A.

In this case, the following method may be used. That is, when the size of the display range 1010 is increased from the state of FIG. 10A, and only when the display range 1010 sticks out from the entire image 1000, as shown in FIG. 10C or 10D, the coordinates of the display range 1010 are adjusted by only a stick-out amount, so as to minimize the stick-out portion of the display range 1010 with respect to the entire image 1000, as exemplified in FIG. 10E. In this case, when the size of the display range 1010 is restored to that in FIG. 10A again after adjustment of the coordinates of the display range 1010, the position of the display range 1010 shifts from that in FIG. 10A by the coordinate adjustment amount of the display range 1010, as shown in, for example, FIG. 10F.

In the aforementioned flowcharts of FIGS. 4A and 4B, information of the reference point to be scrolled is held. That is, in the first embodiment, the update processing of the reference point information in step S317 in the flowchart of FIG. 4B is not executed every time the magnification ratio is changed in step S304. The reason for this will be described below with reference to FIGS. 10A to 10H.

If the reference point information is updated every time the display magnification ratio is changed, the position of the display range with respect to the entire image shifts by magnification ratio changing operation. For example, a case will be examined below wherein the display magnification ratio is changed from the state in FIG. 10A, and both points 1004 and 1005 in the display range 1010 become farthermost points with respect to the entire image 1000, as exemplified in FIG. 10G.

In this case, when the process advances to step S316 after the processing in step S304 in the flowchart of FIG. 4A to execute processing for calculating the reference point, a mid point 1006 of the points 1004 and 1005 is set as a reference point. From this state, the display magnification ratio is restored to the value in FIG. 10A to restore the size of the display range 1010 to that in FIG. 10A. Then, the display range 1010 is calculated by the processing in step S307 in the flowchart of FIG. 4B to have the mid point 1006 as the reference point. As a result, the display range 1010 is displayed at a position exemplified in FIG. 10H, and its position is shifted from that in FIG. 10A.

Figure 10G:
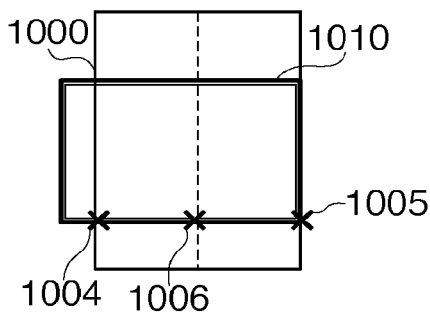
Figure 10H:
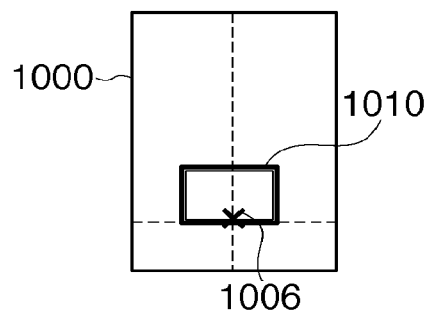

Note that only when the display range 1010 sticks out from the entire image 1000 in the horizontal or vertical direction, as exemplified in FIG. 10G, the position of the display range 1010 may be adjusted so that the center of an effect area of an image matches that of the image display area 210. In this case as well, when the update processing of the reference point information is skipped, if the display magnification ratio is set at the same magnification ratio as in FIG. 10A again, the position of the display range 1010 is never shifted from the state in FIG. 10A.

In this way, according to the first embodiment of the present invention, since the reference point information is held until the display range is changed, a positional shift of the display range upon changing the display magnification ratio can be suppressed.

As described above, according to the first embodiment of the present invention, the farthermost point of the display range with respect to the entire image is set as the reference point used when the display range is increased and decreased upon changing the display magnification ratio. For this reason, a stick-out phenomenon of the display range from the entire image can be suppressed.

Figure 7:
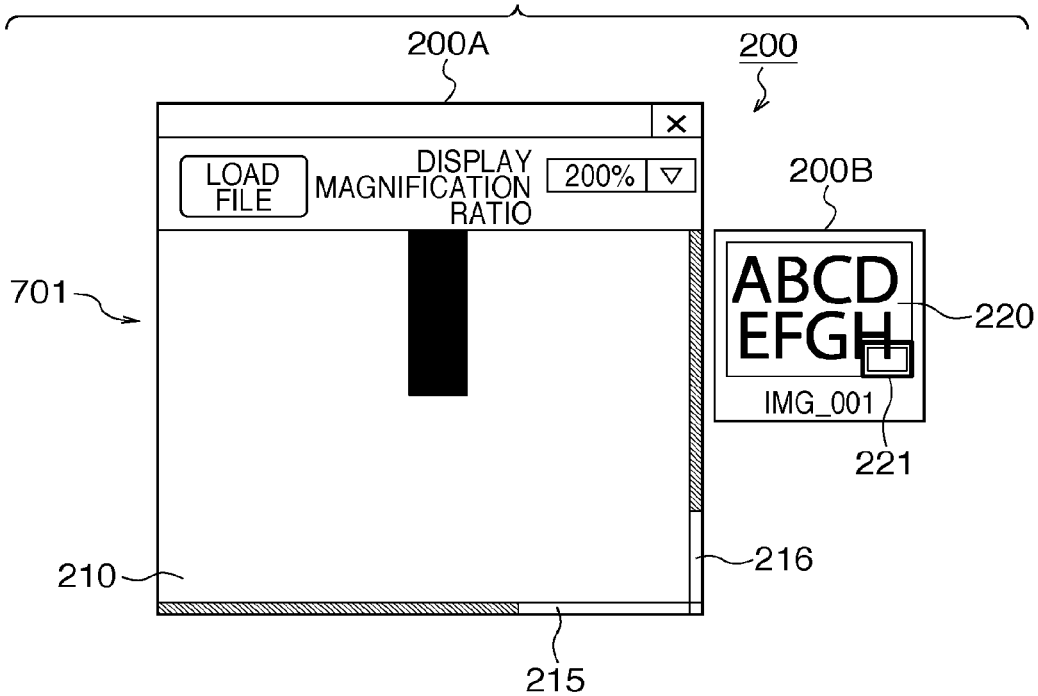
FIG. 7 is a view showing a display example of a UI window.

The UI state in the aforementioned scroll processing and that in the zoom-in processing (2) match, as indicated by the display 701 in FIG. 7. As can be seen from this, according to the first embodiment, since the reference point information used for increase and decrease processes of the display range upon changing the display magnification ratio is not changed, a phenomenon that the position of the display range gradually shifts only by the display magnification ratio changing operations can be suppressed.

<Second Embodiment>

The second embodiment of the present invention will be described hereinafter. In the second embodiment, when a display range is located near the center of an entire image, the center of the display range is set as a reference point for zoom-in and zoom-out processes in addition to the processing of the aforementioned first embodiment.

More specifically, a display magnification ratio is calculated so as to prevent the display range, which is increased using the center of the display range as the reference point, from sticking out from the entire image. When a display magnification ratio designated by a user operation is greater than or equal to a display magnification ratio which can prevent the display range after the increase processing from sticking out from the entire image, the increase processing of the display range is executed using the center of the display range as a reference point. On the other hand, when the designated display magnification ratio is less than or equal to the calculated display magnification ratio, the display range is increased using the farthermost point of the display range with respect to the entire image as a reference point according to the method of the aforementioned first embodiment.

In other words, when an increase ratio of the display range, which ratio can prevent the display range after the increase processing from sticking out from the entire image is less than or equal to that of the display range according to the display magnification ratio designated by a user operation, the increase processing of the display range is executed using the center of the display range as a reference point. On the other hand, when the increase ratio of the display range, which ratio can prevent the display range after the increase processing from sticking out from the entire image is larger than that of the display range according to the designated display magnification ratio, the display range is increased using the farthermost point of the display range with respect to the entire image as a reference point according to the method of the aforementioned first embodiment.

The reason why the reference point used upon increasing the display range is switched according to the display magnification ratio in this way will be described below with reference to FIGS. 11 and 12. When the display range is increased using the farthermost point in the display range from the center of the entire image as a reference point while the display range is located near the center of the entire image, an image displayed on an image display area 210 may seem to have shifted contrary to the expectation.

Figure 11:
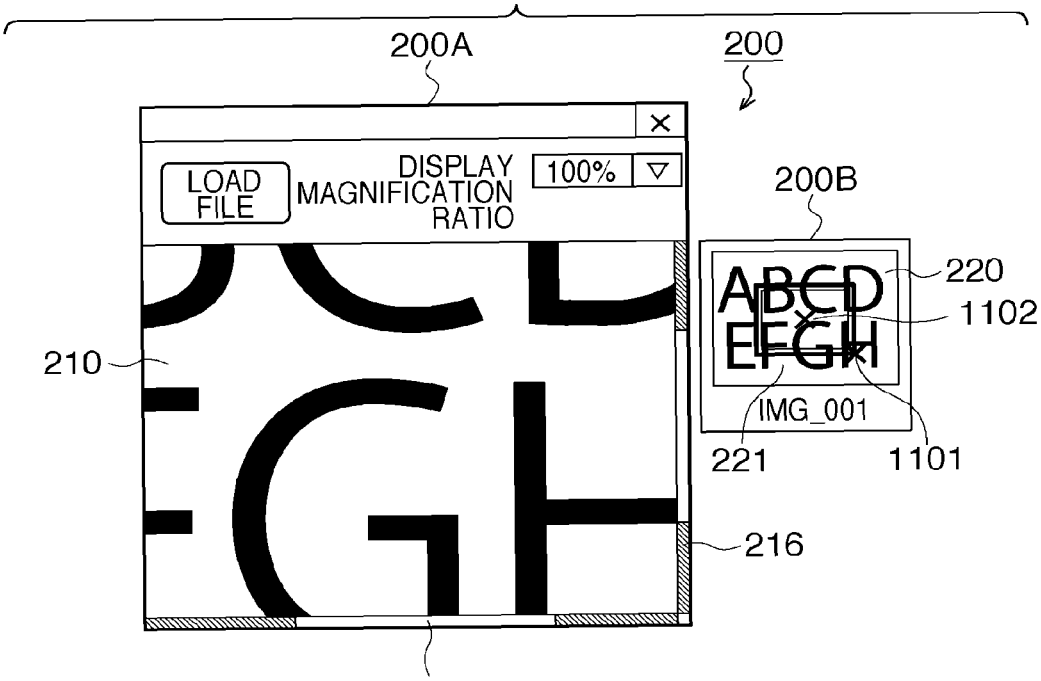
FIG. 11 is a view showing a display example of the UI window.
Figure 12:
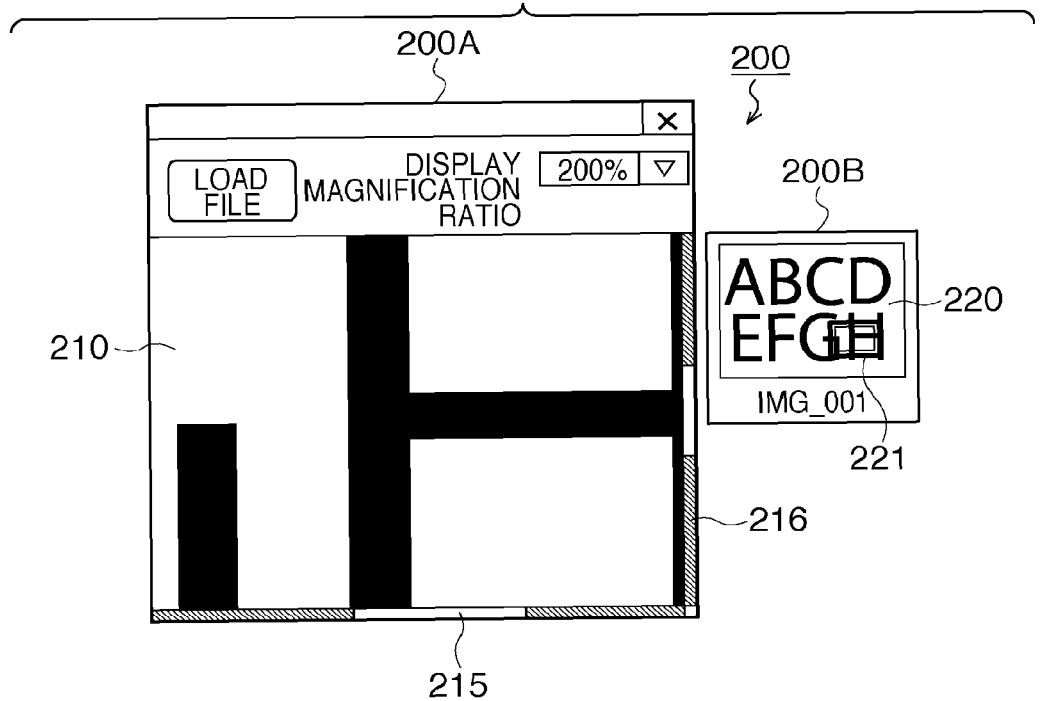
FIG. 12 is a view showing a display example of the UI window.
Figure 13:
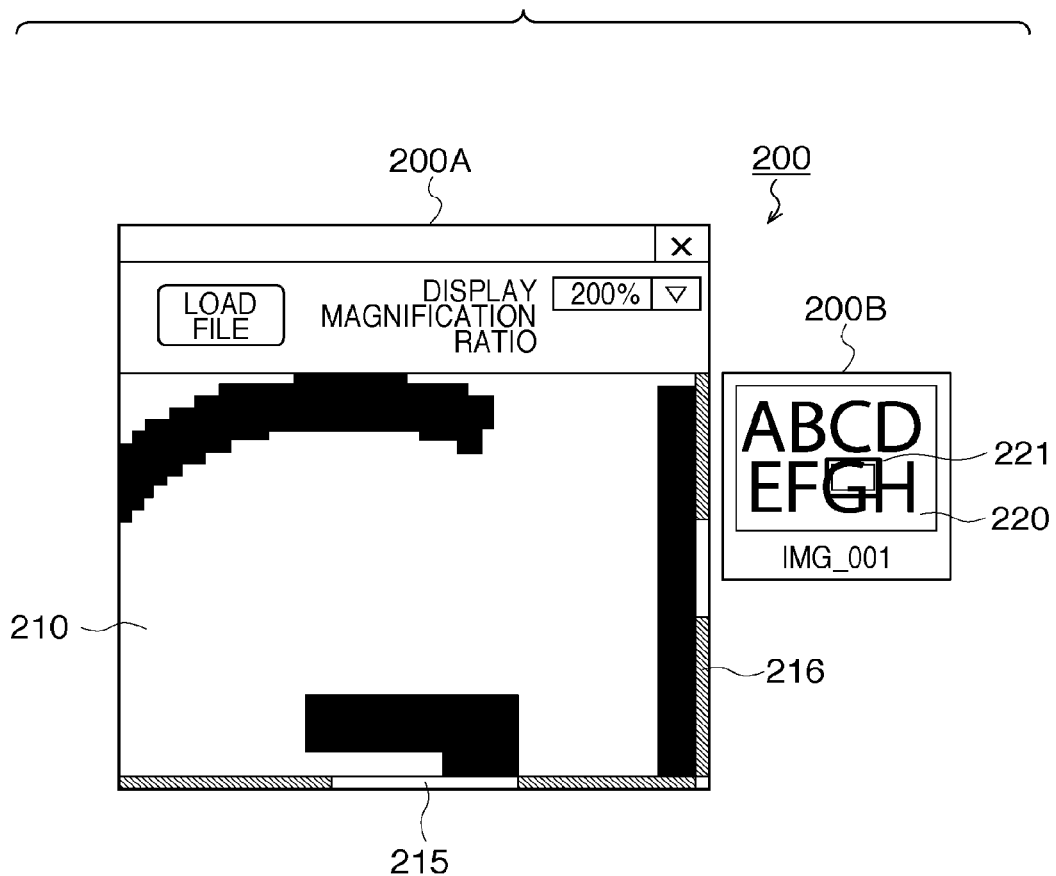
FIG. 13 is a view showing a display example of a UI window.
Figure 15:
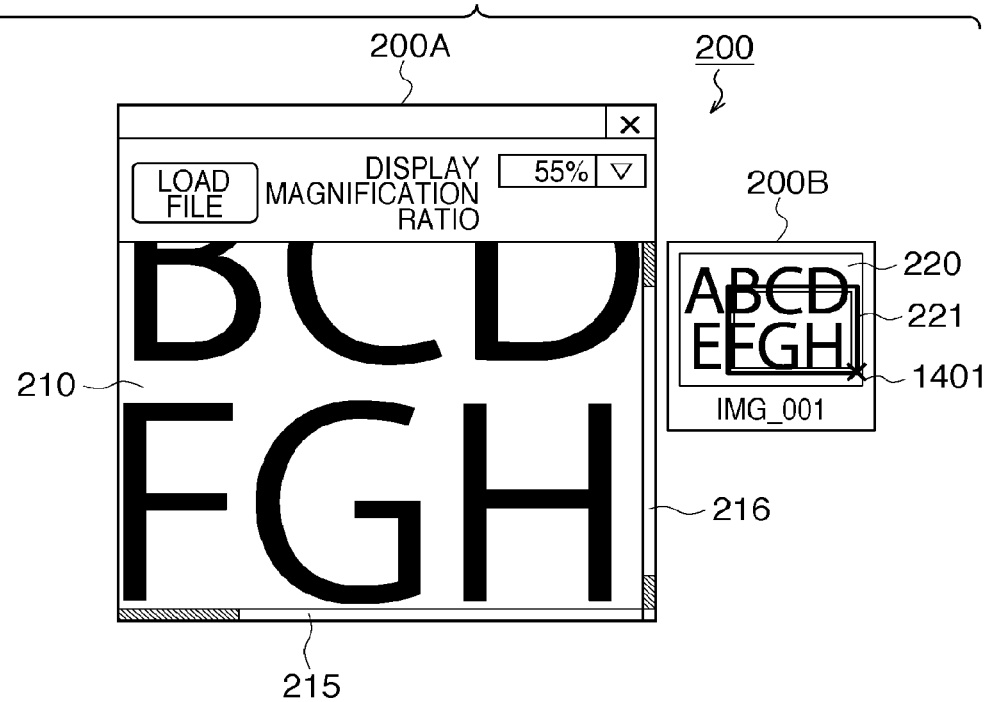
FIG. 15 is a view showing a display example of the UI window.

FIG. 11 shows an example when the display magnification ratio is changed to 100% by a user operation, and the position of the display range is then changed from the center of the entire image in a lower right direction by a scroll operation. A reference point calculated in step S316 in the flowchart of FIG. 4B after the scroll operation is a point 1101. When the display magnification ratio is changed to 200% from this state, a state exemplified in FIG. 12 is displayed based on the display range calculated in step S307. In this case, since the position of the display range moves from the position exemplified in FIG. 11 in the lower right direction to that exemplified in FIG. 12, the user may feel as if the display range had shifted.

Display Control Processing

FIGS. 4A and 14 are flowcharts showing an example of display control processing according to the second embodiment of the present invention. Respective processes in the flowchart of FIGS. 4A and 14 are implemented when a CPU 101 executes a program mapped on a RAM 103. Note that in the flowchart of FIG. 14, the same step numbers denote processes common to those in the aforementioned flowchart of FIG. 4B, and a description thereof will not be repeated. Also, the display control apparatus 100 according to the aforementioned first embodiment is similarly applicable to the second embodiment.

Processes according to the second embodiment, which are different from those according to the aforementioned first embodiment will be described below. After the calculation of the display range changed by the scroll operation in step S313, or processing for setting a window fit magnification ratio View_Mag_Fit as a display magnification ratio View_Mag in step S314, the process advances to step S415.

In step S415, a minimum display magnification ratio View_Mag_N, which can prevent the display range from sticking out from the entire image when the display magnification ratio is changed to have the center of the display range calculated in step S313 or S314 as a reference point, is calculated. The CPU 101 as a minimum display magnification ratio calculation unit calculates this display magnification ratio View_Mag_N according to the program.

For example, the CPU 101 calculates the magnification ratio View_Mag_N as follows. The CPU 101 calculates coordinates centerViewP(centerViewX, centerViewY) of the center of the display range in the entire image by:

$$centerViewX = (iX0 + iX1)/2 \tag{64}$$

$$centerViewY = (iY0 + iY1)/2 \tag{65}$$

Then, the CPU 101 calculates a shorter distance minDisX of a distance from a start point of the entire image to the coordinate centerViewX and that from the coordinate centerViewX to an end point of the entire image in the horizontal direction.

Note that the start point of the entire image indicates an end of the entire image in the origin direction. Also, the end point of the entire image indicates an opposite vertex of the start point in the entire image. The distance from the start point of the entire image to the coordinate centerViewX is equal to the value centerViewX intact. The distance from the coordinate centerViewX to the end point of the entire image assumes a value obtained by subtracting the value centerViewX from a width Image_Width of the entire image.

If following inequality (66) is true, the distance minDisX is obtained by equation (67). On the other hand, if inequality (66) is false, the distance minDisX is calculated by equation (68).

$$centerViewX < Image\_Width - centerViewX \tag{66}$$

$$minDisX = centerViewX \tag{67}$$

$$minDisX = Image\_Width - centerViewX \tag{68}$$

The CPU 101 similarly calculates a shorter distance minDisY of a distance from the start point of the entire image to the coordinate centerViewY and that from the coordinate centerViewY to the end point of the image in the vertical direction. If following inequality (69) is true, the distance minDisY is obtained by equation (70). On the other hand, if inequality (69) is false, the distance minDisY is calculated by equation (71).

$$centerViewY < Image\_Height - centerViewY \tag{69}$$

$$minDisY = centerViewY \tag{70}$$

$$minDisY = Image\_Height - centerViewY \tag{71}$$

The CPU 101 then calculates a minimum display magnification ratio View_Mag_HorN, which can prevent the display range from sticking out in the horizontal direction upon changing the display magnification ratio to have the center of the display range as a reference point according to:

$$View\_Mag\_HorN = ViewArea\_W \times 100/(minDisX \times 2) \tag{72}$$

Also, the CPU 101 then calculates a minimum display magnification ratio View_Mag_VerN, which can prevent the display range from sticking out in the vertical direction upon changing the display magnification ratio to have the center of the display range as a reference point according to:

$$View\_Mag\_VerN = ViewArea\_H \times 100/(minDisY \times 2) \tag{73}$$

The CPU 101 compares the calculated display magnification ratios View_Mag_HorN and View_Mag_VerN, and adopts the ratio which assumes a larger value as a minimum display magnification ratio View_Mag_N which can prevent the display range from sticking out from the entire image. That is, if following inequality (74) is true, the display magnification ratio View_Mag_N is obtained by equation (75). On the other hand, if inequality (74) is false, the magnification ratio View_Mag_N is obtained by equation (76).

$$View\_Mag\_HorN < View\_Mag\_VerN \tag{74}$$

$$View\_Mag\_N = View\_Mag\_VerN \tag{75}$$

$$View\_Mag\_N = View\_Mag\_HorN \tag{76}$$

The process advances to step S416, and the CPU 101 calculates coordinates baseCP(bcX, bcY) of a reference point when a display magnification ratio designated by a user operation is equal greater than or equal to the minimum display magnification ratio View_Mag_N calculated in step S415. In this case, the coordinates centerViewP(centerViewX, centerViewY) of the center of the display range in the entire image are used intact as the coordinates baseCP(bcX, bcY) of the reference point, as described by:

$$bcX = centerViewX \tag{77}$$

$$bcY = centerViewY \tag{78}$$

In next step S417, the CPU 101 calculates coordinates baseSP(bsX, bsY) of a reference point when the display magnification ratio designated by the user operation is less than the minimum display magnification ratio View_Mag_N calculated in step S415. In this case, assume that the coordinates baseSP(bsX, bsY) are those of the farthermost point of the display range from the center of the entire image when the display magnification ratio is set to be the magnification ratio View_Mag_N to have the center of the display range as a reference point for the zoom-in and zoom-out processes.

The display range (i_p1, i_p2, i_p3, i_p4) when the display magnification ratio is set to be the magnification ratio View_Mag_N to have the center of the display range as a reference point can be calculated from equations (13) to (16) above. At this time, values given by equations (79) to (83) are substituted in variables bX, bY, View_Mag, posX, and posY in equations (13) to (16). The coordinates of the farthermost point of the display range from the center of the entire image are calculated from equations (6) to (11) above.

$$bX = bcX \tag{79}$$

$$bY = bcY \tag{80}$$

$$View\_Mag = View\_Mag\_N \tag{81}$$

$$posX = 0.5 \tag{82}$$

$$posY = 0.5 \tag{83}$$

The process advances to step S418, and the CPU 101 holds the following pieces of information (i) to (iv) as the reference point information. Note that the position of the reference point when the designated display magnification ratio is less than the magnification ratio View_Mag_N is held as a numerical value as in the case of step S317 in the flowchart of FIG. 4B.

(i) magnification ratio View_Mag_N (ii) reference point (center point)=baseCP(bcX, bcY) when designated magnification ratio is greater than or equal to magnification ratio View_Mag_N (iii) reference point (farthermost point)=baseSP(bsX, bsY) when designated magnification ratio is less than magnification ratio View_Mag_N (iv) position (farthermost point) of reference point when designated magnification ratio is less than magnification ratio View_Mag_N On the other hand, upon checking in step S305 whether or not the entire image can be entirely displayed on the image display area 210, when the CPU 101 determines that the entire image cannot be entirely displayed on the image display area 210, the process advances to step S406. The CPU 101 checks in step S406 if the display magnification ratio View_Mag is less than the magnification ratio View_Mag_N.

If the CPU 101 determines that the display magnification ratio View_Mag is less than the magnification ratio View_Mag_N, the process advances to step S407. In step S407, the CPU 101 calculates the display range using the reference point (farthermost point)=baseSP(bsX, bsY) and the information of the position of the reference point when the designated magnification ratio is less than the magnification ratio View_Mag_N, which are held in step S418. The calculation method of the display range is the same as that described in step S307 in FIG. 4B.

On the other hand, if the CPU 101 determines in step S406 that the display magnification ratio View_Mag is greater than or equal to the magnification ratio View_Mag_N, the process advances to step S408. In step S408, the CPU 101 calculates the display range using the reference point (center point)=baseCP(bcX, bcY) when the designated magnification ratio is greater than or equal to the magnification ratio View_Mag_N, which is held in step S418. The calculation method of the display range is the same as that described in step S307 of FIG. 4B. Assume that a position (posX, posY) of the reference point at this time is (0.5, 0.5).

After the display range is calculated in step S407 or S408, the process advances to step S309 to display an image on the image display area 210, as described above.

Display Example

The processing according to the second embodiment will be described below more practically with reference to the flowchart of FIG. 14, FIG. 11, and FIGS. 13, 15, and 16. FIG. 11 shows a state in which the user changes the display magnification ratio to 100%, and then makes the scroll operation. Also, assume that the minimum display magnification ratio View_Mag_N which can prevent the display range from sticking out from the entire image (to be referred to as a minimum display magnification ratio View_Mag_N hereinafter) is 55%.

When the display magnification ratio is changed from the state in FIG. 11 to 200%, the CPU 101 determines in step S406 in FIG. 14 that the display magnification ratio View_Mag is not less than the minimum display magnification ratio View_Mag_N (NO). Then, the CPU 101 calculates the display range to have a point 1102 of the center of the display range after the scroll operation as a reference point. As a result, the state of a UI window 200 is as exemplified in FIG. 13. Since the display range is decreased to have the center 1102 of the display range as the reference point, that is, an image to be displayed on the image display area 210 is zoomed in, shift feeling is suppressed unlike in the example of FIG. 12 in which the display range is calculated to have the farthermost point 1101 of the display range as the reference point.

When the display magnification ratio is changed from the state in FIG. 13 to 55%, that is, the same magnification ratio as the minimum display magnification ratio View_Mag_N, the CPU 101 determines in step S406 that the display magnification ratio View_Mag is not less than the minimum display magnification ratio View_Mag_N. Therefore, the CPU 101 calculates the display range to have the center 1102 of the display range after the scroll operation as a reference point. As a result, the state of the UI window 200 is as exemplified in FIG. 15.

When the display magnification ratio is changed from the state in FIG. 15 to 50%, the CPU 101 determines in step S406 that the display magnification ratio View_Mag is less than the minimum display magnification ratio View_Mag_N. Therefore, the CPU 101 calculates the display range to have a farthermost point 1401 of the display range with respect to the entire image as a reference point, as exemplified in FIG. 15. As a result, the state of the UI window 200 is as exemplified in FIG. 16. When the display magnification ratio View_Mag is less than or equal to the minimum display magnification ratio View_Mag_N, the display range is calculated to have the farthermost point from the center of the entire image in the display range when the display magnification ratio is equal to the minimum display magnification ratio View_Mag_N. For this reason, a stick-out phenomenon of the display range from the entire image can be suppressed.

Figure 16:
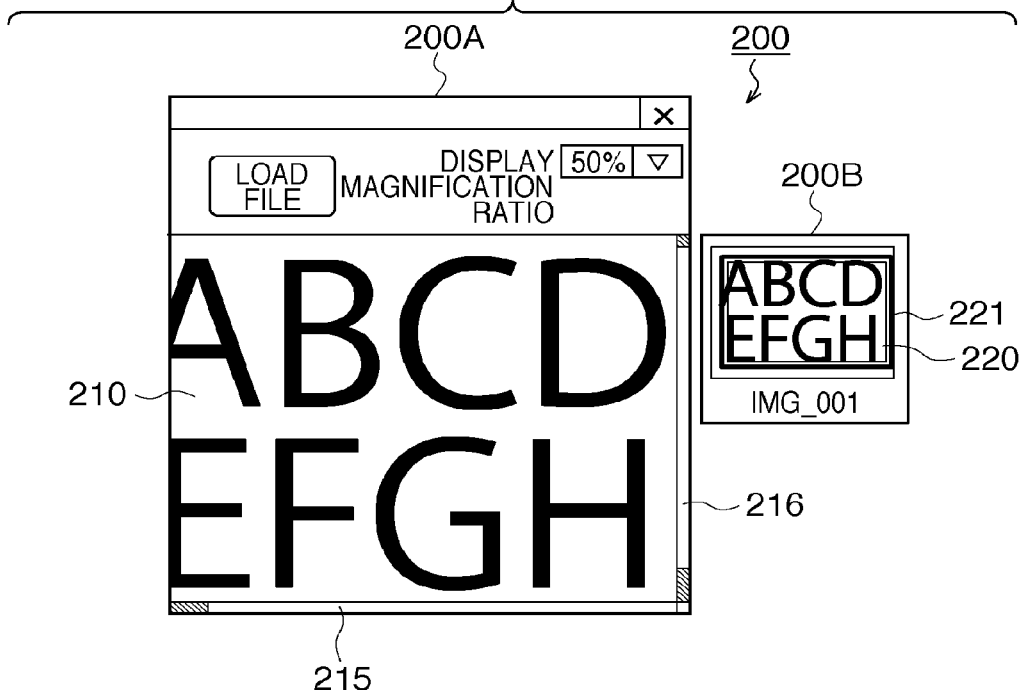
FIG. 16 is a view showing a display example of the UI window.
Figure 17A:
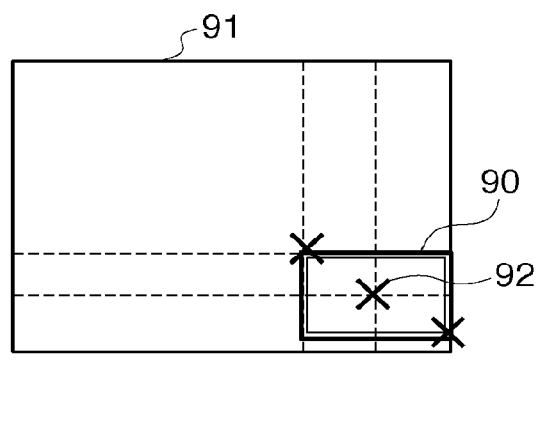
FIGS. 17A to 17D are views for explaining the problem of the related art.
Figure 17B:
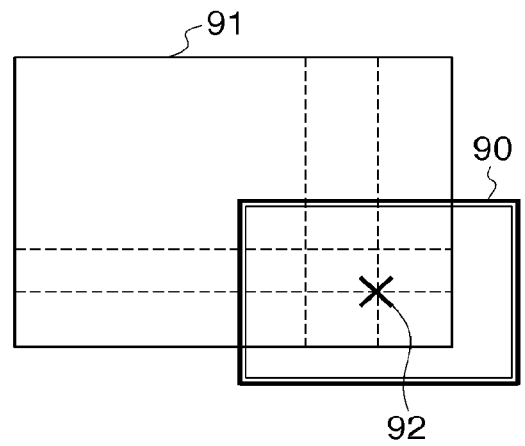
Figure 17C:
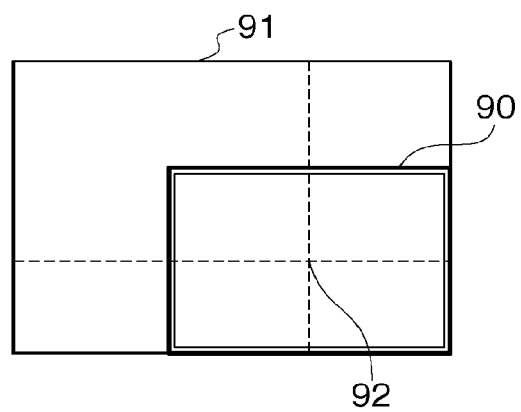
Figure 17D:
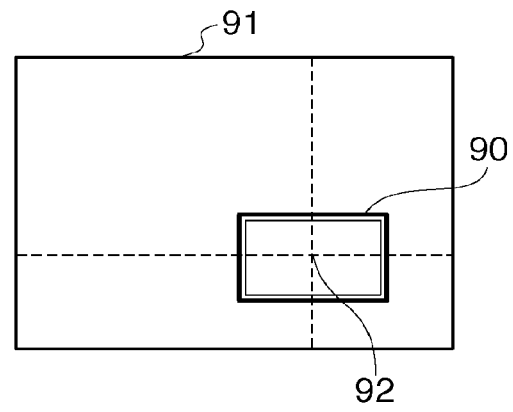

A case will be examined below wherein the user changes the display magnification ratio from the state exemplified in FIG. 11 to 50% shown in FIG. 16, and then changes it to 100%. In this case, the CPU 101 determines in step S406 that the display magnification ratio View_Mag is not less than the minimum display magnification ratio View_Mag_N, and calculates the display range to have the center 1102 of the display range after the zoom-in operation as a reference point. As a result, the state of the UI window 200 is restored to the state exemplified in FIG. 11. Since the reference point information is not changed by a display magnification ratio changing operation, the UI state can be restored to the initial state in this way.

Note that when display magnification ratio View_Mag is less than the magnification ratio View_Mag_N in step S406 above, the process advances to step S407, and the CPU 101 calculates the display range to have the farthest point as a reference point. In this case, if the display magnification ratio View_Mag immediately before it is determined that the display magnification ratio View_Mag is less than the magnification ratio View_Mag_N is larger than the magnification ratio View_Mag_N, the CPU 101 may temporarily set the display magnification ratio View_Mag as the magnification ratio View_Mag_N, and may calculate the display range after the magnification ratio is changed to have the center point of the immediately preceding display range as a reference point. That is, when the display magnification ratio View_Mag is changed from the state in which it is larger than the magnification ratio View_Mag_N to a magnification ratio less than the magnification ratio View_Mag_N, the CPU 101 temporarily sets the display magnification ratio View_Mag as the magnification ratio View_Mag_N irrespective of the magnification ratio designated by the user. After that, the CPU 101 calculates the display range to have the farthermost point of the display range when the display magnification ratio=View_Mag_N as a reference point until the magnification ratio designated by the user is obtained. In this way, when variable magnification processing is executed to have the center of the display range as a reference point up to a limit display magnification ratio which can prevent the display range from sticking out from the entire image, the user can make a variable magnification operation while shift feeling is suppressed more.

Upon calculating the display range to have the farthermost point as a reference point in step S407, the CPU 101 may calculate, in advance, a minimum magnification ratio which can prevent a vertex (diagonal point) of the display range which forms an opposing corner of the farthermost point of the display range with respect to the center of the entire image from sticking out from the entire image upon execution of variable magnification processing with reference to the farthermost point. Then, the CPU 101 checks if the designated magnification ratio after the changing operation is smaller than the minimum magnification ratio which can prevent the diagonal point from sticking out from the entire image upon execution of the variable magnification processing with reference to the farthermost point. If the designated magnification ratio is smaller than the minimum magnification ratio, the CPU 101 sets the display range to be equal to the entire image irrespective of the designated magnification ratio after the changing operation. In this way, even upon execution of the variable magnification processing to have the farthest point as a reference point, the display range can be suppressed from sticking out from the entire image after the display magnification ratio is changed.

As described above, according to the present invention, since the farthermost point of the display range with respect to the entire image is used as a reference point upon changing the display magnification ratio, the display range can be suppressed from sticking out from the entire image after the display magnification ratio is changed.

Also, according to the present invention, since the reference point information is not changed upon changing the display magnification ratio, a problem that the position of the display range gradually shifts by only changing the display magnification ratio is never posed. In addition, according to the second embodiment of the present invention, shift feeling upon increasing the display range in a state in which the display range is located near the center of the entire image can be suppressed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-025098, filed on Feb. 5, 2009, which is hereby incorporated by reference herein in its entirety.

What is claimed is:

1. A display control apparatus which executes variable magnification processing of a partial image of an image, the partial image indicated by a display range set in the image, and to display the partial image within a display area, said apparatus comprising:
a moving unit which moves the display range for the image, in response to an instruction for moving a position of the display range, without changing a size of the display range;
a calculation unit that, after movement of the display range for the image by said moving unit, (i) calculates a distance from a center of the image to each of a plurality of vertices of the display range, (ii) determines which of the plurality of vertices has the largest distance from the center of the image, (iii) and sets the vertex with the largest distance from the center of the image as a reference point, the vertex set as the reference point being different depending on the position of the display range in the image that the display range is moved to by said moving unit;
a changing unit which changes, in response to an instruction for performing the variable magnification processing, the size of the display range so that the reference point set by said calculation unit is located at the same position in the image in display ranges before and after the size is changed without changing the size of the display area; and
a display control unit which executes the variable magnification processing of the partial image indicated by the display range changed by said changing unit, and displays the partial image within the display area.

2. The apparatus according to claim 1, further comprising a minimum magnification ratio calculation unit which calculates, when the display range in the image is to be increased, a minimum magnification ratio, the minimum magnification ratio being a magnification ratio that makes the size of the display range corresponding to the partial image to be displayed in the display area a maximum size within the image,
wherein said calculation unit further calculates a center point of the display range as the reference point,
said changing unit compares, when the size of the display range is changed, a designated magnification ratio to the minimum magnification ratio calculated by said minimum magnification ratio calculation unit, the designated magnification being designed by the instruction for performing variable magnification processing, and
when the designated magnification ratio is not less than the minimum magnification ratio as a result of the comparison, said changing unit uses the center point of the display range as the reference point to change the size of the display range, and, when the designated magnification ratio is less than the minimum magnification ratio, said changing unit uses the vertex or the center point of the display range as the reference point to change the size of the display range.

3. The apparatus according to claim 1, further comprising a minimum magnification ratio calculation unit which calculates, when the display range in the image is to be increased, a minimum magnification ratio, the minimum magnification ratio being a magnification ratio that makes the size of the display range corresponding to the partial image to be displayed in the display area a maximum size within the image, wherein said changing unit compares, when the size of the display range is changed, a designated magnification ratio to the minimum magnification ratio calculated by said minimum magnification ratio calculation unit, the designated magnification being designed by the instruction for performing variable magnification processing, and when the designated magnification ratio is less than the minimum magnification ratio as a result of the comparison, said changing unit sets the image as a whole of the display range.

4. A non-transitory computer-readable recording medium which records a program for making a computer function as respective units of a display control apparatus according to claim 1.

5. A display control apparatus which executes variable magnification processing of a partial image of an image, the partial image indicated by a display range set in the image, and to display the partial image within a display area, said apparatus comprising:

a moving unit which moves the display range, in the image in response to an operation for moving a position of the display range, without changing a size of the display range;

a calculation unit that, after movement of the display range for the image by said moving unit, (i) sets a center point of the display range as a first reference point, (ii) calculates a distance from a center of the image to each of a plurality of vertices of the display range, (iii) determines which of the plurality of vertices has the largest distance from the center of the image, (iv) and sets the vertex with the largest distance from the center of the image as a second reference point, the vertex set as the reference point being different depending on the position of the display range in the image that the display range is moved to by said moving unit;

a minimum magnification ratio calculation unit which calculates, when the display range in the image is to be increased, a minimum magnification ratio, the minimum magnification ratio being a magnification ratio that makes the size of the display range corresponding to the partial image to be displayed in the display area a maximum size within the image; and a changing unit which, when the size of the display range is changed in response to an instruction for performing the variable magnification processing, (i) compares a designated magnification to the minimum magnification ratio, the designated magnification being designed by the instruction for performing variable magnification processing, (ii) changes, when the designated magnification is not less than the minimum magnification ratio as a result of the comparison, the size of the display range so that the first reference point is located at the same position in the image in display ranges before and after the size is changed, (iii) changes, when the designated magnification is less than the minimum magnification ratio, the size of the display range up to the minimum magnification ratio so that the first reference point is located at the same position in the image in the display ranges before and after the size is changed, and (iv) further changes the size of the display range up to the designated magnification ratio so that the second reference point is located at the same position in the image in the display ranges before and after the size is changed, the size of the display area not being changed while the size of the display range is changed; and a display control unit which executes the variable magnification processing of the partial image indicated by the display range changed by said changing unit, and displays the partial image within the display area.

6. A non-transitory computer-readable recording medium which records a program for making a computer function as respective units of a display control apparatus according to claim 5.

7. A display control method to be performed by a display control apparatus which executes variable magnification processing of a partial image of an image, the partial image indicated by a display range set in the image, and to display the partial image within a display area on a display apparatus, the method comprising:

a moving step of moving the display range in the image, in response to an instruction for moving a position of the display range, without changing a size of the display range; and a calculation step of, after movement of the display range for the image in the moving step, (i) calculating a distance from a center of the image to each of a plurality of vertices of the display range, (ii) determining which of the plurality of vertices has the largest distance from the center of the image, (iii) and setting the vertex with the largest distance from the center of the image as a reference point, the vertex set as the reference point being different depending on the position of the display range in the image that the display range is moved to by said moving unit;

a changing step of changing, in response to an instruction for performing the variable magnification processing, the size of the display range so that the reference point set in the calculation step is located at the same position in the image in display ranges before and after the size is changed without changing the size of the display area; and a display control step of executing the variable magnification processing of the partial image indicated by the display range changed in the changing step, and displaying the partial image within the display area on the display apparatus.

8. A display control method to be performed by a display control apparatus which executes variable magnification processing of a partial image of an image, the image indicated by a display range set in the image, and to display the partial image within a display area on a display apparatus, the method comprising:

a moving step of moving the display range in the image in response to an instruction for moving a position of the display range without changing a size of the display range;

a calculation step of, after movement of the display range for the image in the moving step, (i) setting a center point of the display range as a first reference point, (ii) calculating a distance from a center of the image to each of a plurality of vertices of the display range, (iii) determining which of the plurality of vertices has the largest distance from the center of the image, (iv) and setting the vertex with the largest distance from the center of the image as a second reference point, the vertex set as the reference point being different depending on the position of the display range in the image that the display range is moved to by said moving unit;

a minimum magnification ratio calculation step of calculating, when the display range in the image is to be increased, a minimum magnification ratio, the minimum magnification ratio being a magnification ratio that makes the size of the display range corresponding to the partial image to be displayed in the display area a maximum size within the image;

a changing step of, when the size of the display range is changed in response to an operation for performing the variable magnification processing, (i) comparing a designated magnification to the minimum magnification ratio, the designated magnification being designed by the instruction for performing variable magnification processing, (ii) changing, when the designated magnification is not less than the minimum magnification ratio as a result of the comparison, the size of the display range so that the first reference point is located at the same position in the image in display ranges before and after the size is changed, (iii) changing, when the designated magnification is less than the minimum magnification ratio, the size of the display range up to the minimum magnification ratio so that the first reference point is located at the same position in the image in the display ranges before and after the size is changed, and (iv) further changing the size of the display range up to the designated magnification ratio so that the second reference point is located at the same position in the image in the display ranges before and after the size is changed, with the size of the display area not being changed while the size of the display range is changed; and a display control step of executing the variable magnification processing of the partial image indicated by the display range changed in the changing step, and displaying the partial image within the display area on the display apparatus.

* * * * *